US012472618B2

(12) United States Patent
Scott et al.

(10) Patent No.: US 12,472,618 B2
(45) Date of Patent: Nov. 18, 2025

(54) POWERED FASTENER DRIVER AND EXTENSION

(71) Applicant: MILWAUKEE ELECTRIC TOOL CORPORATION, Brookfield, WI (US)

(72) Inventors: John S. Scott, Brookfield, WI (US); Gareth Mueckl, Milwaukee, WI (US); Caroline Fox, Richfield, WI (US); Isabel M. Lloyd, West Allis, WI (US); Matthew Post, Milwaukee, WI (US); Adam N. Carter, Milwaukee, WI (US); Jonathan L. Lambert, Milwaukee, WI (US); Logan M. Hietpas, Glendale, WI (US); Matthew N. Thurin, Richfield, WI (US); Paul Fry, Pewaukee, WI (US); Julia L. Savich, Shorewood, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/390,589

(22) Filed: Dec. 20, 2023

(65) Prior Publication Data

US 2024/0116165 A1 Apr. 11, 2024

Related U.S. Application Data

(63) Continuation of application No. 16/541,974, filed on Aug. 15, 2019, now Pat. No. 11,858,110.

(Continued)

(51) Int. Cl.
*B25G 1/04* (2006.01)
*B25C 1/06* (2006.01)

(52) U.S. Cl.
CPC . *B25G 1/04* (2013.01); *B25C 1/06* (2013.01)

(58) Field of Classification Search
CPC .. B25G 1/04; B25G 1/043; B25C 1/06; B25C 1/04; B25F 3/00; B25F 5/02; B25F 5/021; B25F 5/00
See application file for complete search history.

(56) References Cited

U.S. PATENT DOCUMENTS 3,952,239 A * 4/1976 Owings .................... B25F 5/02
173/171
5,181,369 A * 1/1993 Everts .................... A01D 34/78
D8/8

(Continued)

FOREIGN PATENT DOCUMENTS

CN 201900631 U 7/2011
EP 1916066 A1 4/2008

(Continued)

OTHER PUBLICATIONS

International Search Report and Written Opinion for Application No. PCT/US2019/046686, dated Dec. 2, 2019 (21 pages).

(Continued)

*Primary Examiner* — Veronica Martin
(74) *Attorney, Agent, or Firm* — Michael Best & Friedrich LLP

(57) ABSTRACT

A powered fastener driver includes a driver unit, a handle unit, and a handle extension. The handle unit is selectively and removably attachable to the driver unit. The handle extension has a first end and a second end, the handle extension being selectively and removably attachable to the driver unit at the first end, and being selectively and removably attachable to the handle unit at the second end. The powered fastener driver is adjustable between a first configuration in which the handle unit is directly attached to the driver unit, and a second configuration in which the driver unit is attached to the handle extension at the first end, and (Continued)

the handle unit is attached to the handle extension at the second end.

22 Claims, 26 Drawing Sheets

Related U.S. Application Data

(60) Provisional application No. 62/841,526, filed on May 1, 2019, provisional application No. 62/789,237, filed on Jan. 7, 2019, provisional application No. 62/719,237, filed on Aug. 17, 2018.

(56) References Cited

U.S. PATENT DOCUMENTS

| | | | | |
|---|---|---|---|---|
| 6,656,626 | B1 | 12/2003 | Mooty et al. | |
| 8,136,254 | B2 * | 3/2012 | Gieske | A01G 3/08 16/427 |
| 9,114,493 | B2 * | 8/2015 | Pettersson | B25H 1/0092 |
| 9,114,494 | B1 | 8/2015 | Mah | |
| 9,956,677 | B2 | 5/2018 | Baskar et al. | |
| 2011/0198381 | A1 * | 8/2011 | McCardle | B25C 1/06 227/8 |
| 2012/0037386 | A1 | 2/2012 | Cook | |
| 2013/0118767 | A1 | 5/2013 | Cannaliato et al. | |
| 2014/0209656 | A1 | 7/2014 | Wu | |

FOREIGN PATENT DOCUMENTS

| | | | |
|---|---|---|---|
| EP | 2801450 | A1 | 11/2014 |
| FR | 1104763 | A | 11/1955 |
| GB | 2134027 | A | 8/1984 |
| WO | 2011058523 | A2 | 5/2011 |

OTHER PUBLICATIONS

Extended European Search Report for Application No. 19849555.8 dated May 11, 2022 (9 pages).

European Patent Office Action for Application No. 23201955.4 dated Oct. 21, 2024 (6 pages).

* cited by examiner

POWERED FASTENER DRIVER AND EXTENSION

CROSS-REFERENCE TO RELATED APPLICATIONS

This application is a continuation of U.S. patent application Ser. No. 16/541,974 filed on Aug. 15, 2019, now U.S. Pat. No. 11,858,110, which claims priority to U.S. Provisional Patent Application No. 62/719,237 filed on Aug. 17, 2018, U.S. Provisional Patent Application No. 62/789,237 filed on Jan. 7, 2019, and U.S. Provisional Patent Application No. 62/841,526 filed on May 1, 2019, the entire contents of each of which are incorporated herein by reference.

FIELD OF THE INVENTION

The present invention relates to powered fastener drivers, and more particularly to powered fastener drivers adapted for attaching workpieces to elevated work surfaces.

BACKGROUND OF THE INVENTION

Users may use fasteners to attach hardware, e.g., piping clips (conduit, PVC sprinkler pipes), ceiling wire (conduit, HVAC ducts), and straps (HVAC ducts) to walls, ceilings, etc. When fastening overhead, it may be challenging, difficult, or unwieldy to hold a powered fastener driver overhead, especially on a ladder.

SUMMARY OF THE INVENTION

The present invention provides, in one aspect, a powered fastener driver for driving fasteners into a workpiece. The powered fastener driver includes a driver unit and a handle unit selectively and removably attachable to the driver unit. The driver unit includes a housing, a motor, and a first coupler. The handle unit includes a battery receptacle for receiving a battery pack, a trigger, and a second coupler. The first and second couplers selectively engage one another to mechanically and electrically connect the driver unit to the handle unit.

The present invention provides, in another aspect, a powered fastener driver for driving fasteners into a workpiece. The powered fastener driver includes a driver unit, a handle unit, and a handle extension. The handle unit is selectively and removably attachable to the driver unit. The handle extension has a first end and a second end, the handle extension being selectively and removably attachable to the driver unit at the first end, and being selectively and removably attachable to the handle unit at the second end. The powered fastener driver is adjustable between a first configuration in which the handle unit is directly attached to the driver unit, and a second configuration in which the driver unit is attached to the handle extension at the first end, and the handle unit is attached to the handle extension at the second end.

The present invention provides, in another aspect, a powered fastener driver for driving fasteners into a workpiece. The powered fastener driver includes a housing, a handle coupled to the housing, a trigger coupled to the handle, and a nosepiece. The trigger is configured to selectively activate the powered fastener driver to drive fasteners into the workpiece. The nosepiece has a means for inserting fasteners into the powered fastener driver.

The present invention provides, in another aspect, a method of assembling a powered fastener driver including a driver unit having a first coupler and a handle unit having a second coupler. The method includes engaging the first coupler with the second coupler to mechanically and electrically connect the handle unit to the driver unit.

The present invention provides, in another aspect, a method of assembling a powered fastener driver including a driver unit having a first coupler, a handle unit having a second coupler, and a handle extension having a third coupler and a fourth coupler. The method includes engaging the first coupler with the third coupler to mechanically and electrically connect the driver unit to the handle extension. The method also includes engaging the second coupler with the fourth coupler to mechanically and electrically connect the handle unit to the handle extension.

The present invention provides, in another aspect, a powered fastener driver for driving fasteners into a workpiece. The powered fastener driver includes a housing, a handle coupled to the housing, a trigger coupled to the handle, and an alignment device including a positioning sensor. The trigger is configured to selectively activate the powered fastener driver to drive fasteners into the workpiece. The alignment device is configured to indicate to a user when the powered fastener driver is positioned in an orientation to drive fasteners perpendicularly into the workpiece.

The present invention provides, in another aspect, a powered nailer for performing overhead fastening operations. The powered nailer includes a nailer portion and a handle portion separated from the nailer portion by an extension portion. The handle portion includes a motor, a transmission, and a battery receptacle. Power generated by the motor is transmitted from the handle portion to the nailer portion via a driveshaft that extends through the extension portion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
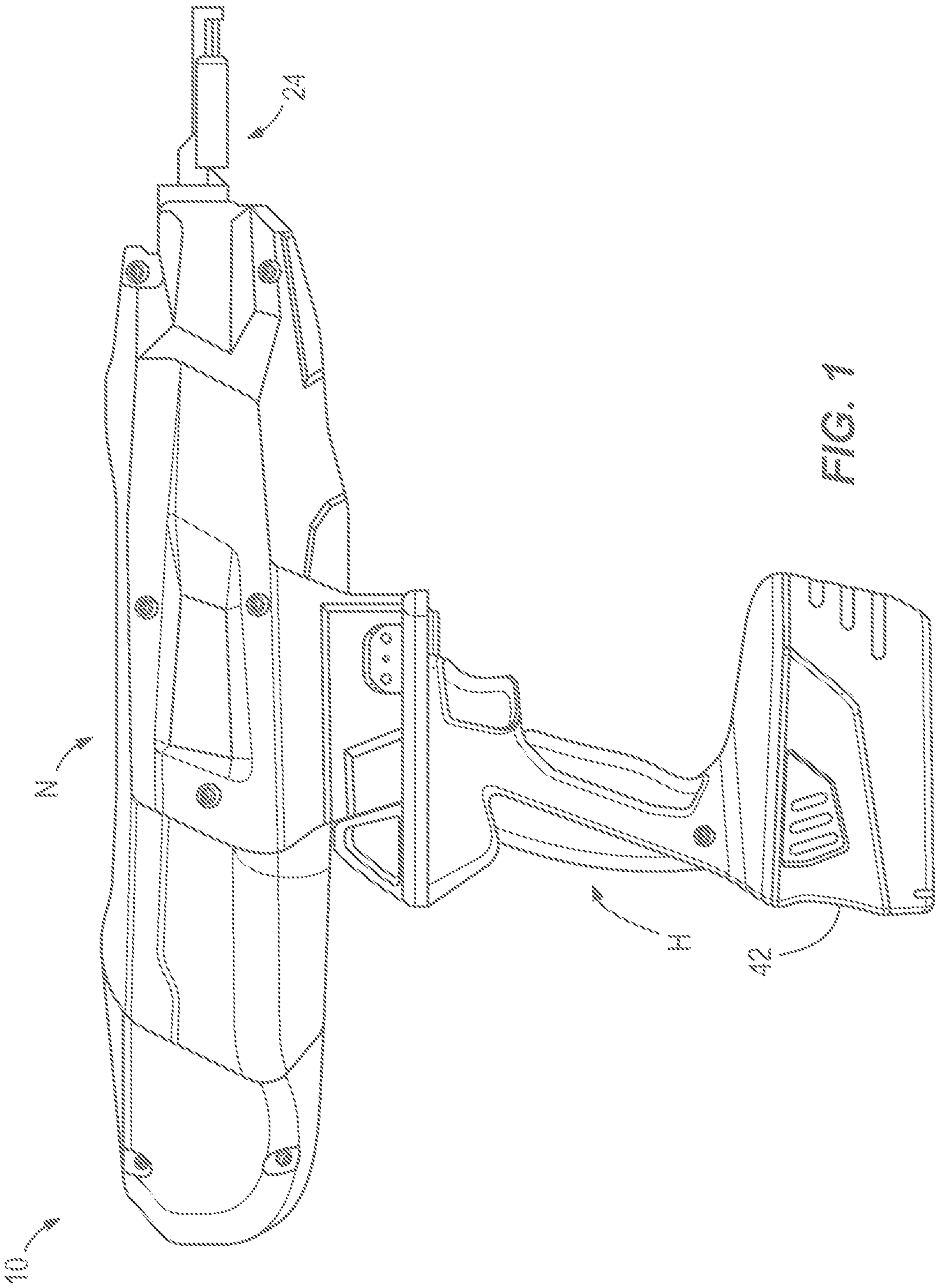
FIG. 1 is a plan view of a powered fastener driver arranged in a first configuration.

FIG. 1 illustrates a powered fastener driver 10 capable of discharging fasteners (e.g., nails) into a workpiece, such as a concrete floor, wall, or ceiling. In some embodiments, the powered fastener driver 10 may be configured as a single-shot powered fastener driver capable of discharging individual fasteners, one at a time, as they are manually loaded into the fastener driver after each driving cycle. In other embodiments, the powered fastener driver 10 may be configured as a multi-shot powered nailer including a magazine holding a collated fastener strip, which does not require the user to manually reload the fastener driver after each driving cycle.

Figure 2:
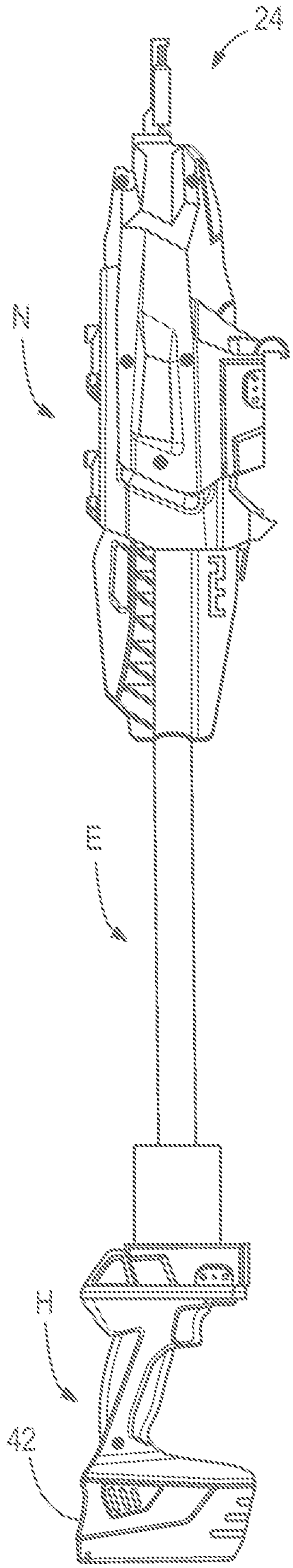
FIG. 2 is a plan view of the powered fastener driver of FIG. 1 arranged in a second configuration.
Figure 3:
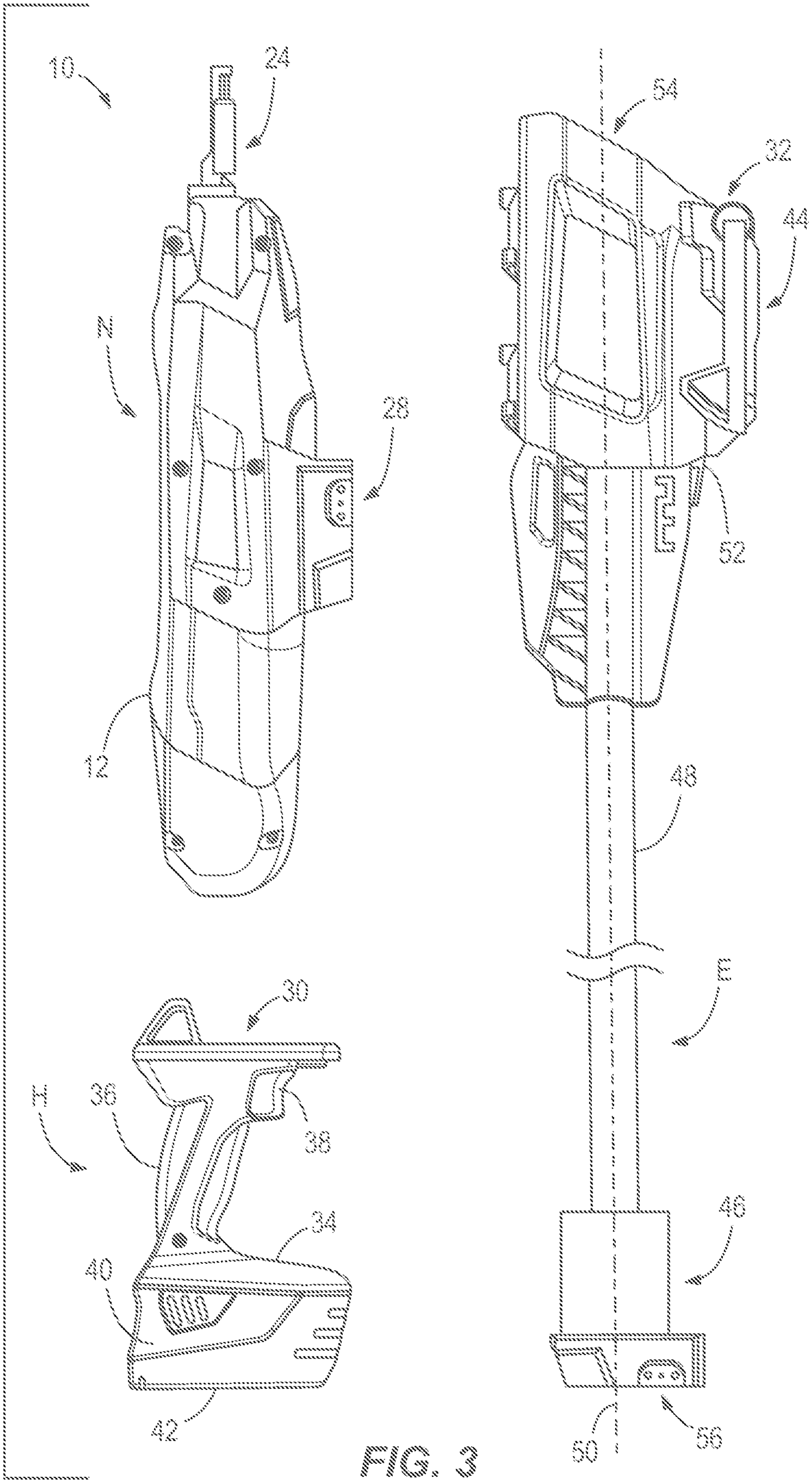
FIG. 3 is a plan view of a driver unit, a handle unit, and a handle extension of the powered fastener driver of FIG. 1.

With reference to FIGS. 1-3 and 10-13, the powered fastener driver 10 includes a handle unit H and a driver unit N selectively and removably attachable to the handle unit H. A handle extension E is selectively attachable intermediate the handle unit H and the driver unit N to permit the user to lift the powered fastener driver 10 even higher toward an elevated work surface (e.g., a concrete ceiling) than without the handle extension E. The powered fastener driver 10 is operable in a first configuration with the handle unit H directly attached to the driver unit N (FIG. 1). Alternatively, the powered fastener driver 10 is operable in a second configuration with the handle extension E coupled between the handle unit H and the driver unit N (FIG. 2).

Figure 4:
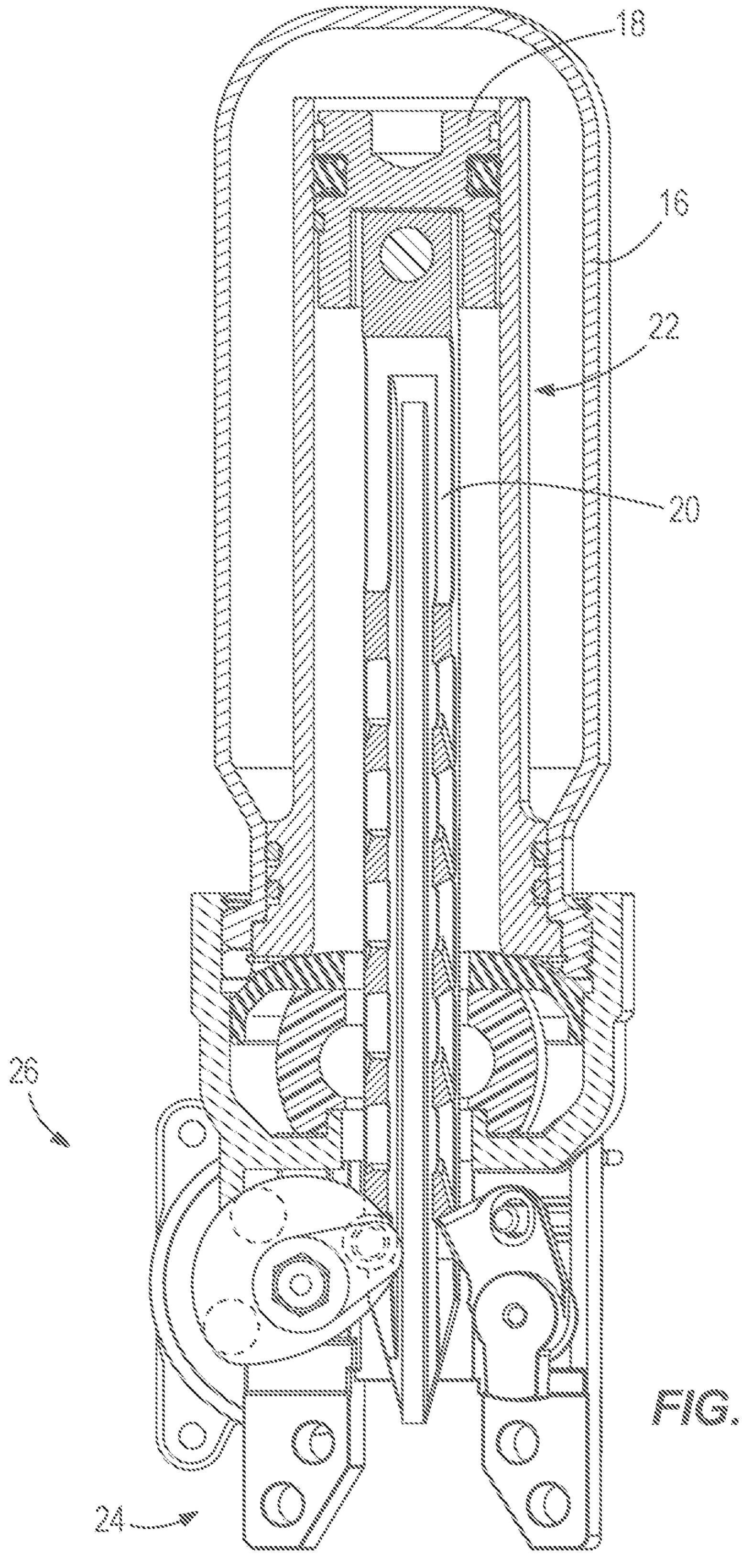
FIG. 4 is a cross-sectional view of a portion of the powered fastener driver of FIG. 1.

In the illustrated embodiment, the powered fastener driver 10 is a gas-spring powered nailer 10. With reference to FIG. 4, the driver unit N includes a housing 12 (FIG. 3) containing therein a motor (e.g., a brushless direct current electric motor) that supplies a motive force to operate the powered nailer 10. The housing 12 further contains a cylinder 16, a drive piston 18 located within the cylinder 16 for reciprocal movement therein, and a drive blade 20 attached to the drive piston 18. The powered nailer 10 also includes a gas spring 22 (i.e., a fixed quantity of compressed gas, such as nitrogen) within the cylinder 16 which, during a fastener driving operation, expands within the cylinder 16 to displace the drive piston 18 and the drive blade 20 toward a workpiece or work surface to drive the fastener out a nosepiece 24 and into the workpiece or work surface. The powered nailer 10 also includes a lifter mechanism 26 coupled between the motor and the drive piston 18. The lifter mechanism 26 returns the drive piston 18 and drive blade 20 toward a top-dead-center position within the cylinder 16 (shown in FIG. 4), which compresses the gas spring 22 for a subsequent fastener driving operation.

Referring back to FIG. 3, the driver unit N further includes a first coupler 28 (also shown in FIG. 10) selectively engageable with corresponding second and third couplers 30, 32 (also shown in FIGS. 10 and 11) located on each of the handle unit N and the handle extension E, respectively. When engaged, the first and second couplers 28, 30 mechanically and electrically couple the driver unit N directly to the handle unit H. Likewise, the first and third couplers 28, 32 engage to mechanically and electrically couple the driver unit N directly to the handle extension E. The first coupler 28 includes, in some embodiments, a pair of rails (not shown) engageable with corresponding grooves located on each of the corresponding second and third couplers 30, 32 to form a tongue and groove mechanical coupling therebetween. The first coupler 28 further includes electrical contacts (e.g., male and/or female blade terminals) engageable with corresponding electrical contacts located on each of the corresponding second and third couplers 30, 32 to form electrical connections therebetween. A latch mechanism may be provided on one or more of the first, second, and third couplers 28, 30, 32 to selectively secure and release the connections formed between the couplers 28, 30, 32.

The handle unit H includes a handle body 34 having the second coupler 30, a gripping portion 36 for grasping by a user, a trigger 38, and a battery receptacle 40 (also shown in FIG. 10) for receiving a battery pack 42. In the illustrated embodiment of the powered nailer 10, the motor receives power from the battery pack 42. The battery pack 42 may include any of a number of different nominal voltages (e.g., 12V, 18V, etc.), and may be configured having any of a number of different chemistries (e.g., lithium-ion, nickel-cadmium, etc.). Alternatively, the motor may be powered by a remote power source (e.g., a household electrical outlet) through a power cord extending from the handle unit H. In some embodiments, the handle unit H further includes a control unit (e.g., a printed circuit board assembly (PCBA)) for sending and receiving control signals between the battery pack 42, the trigger 38, the motor, and sensors associated with the powered nailer 10.

Figure 5:
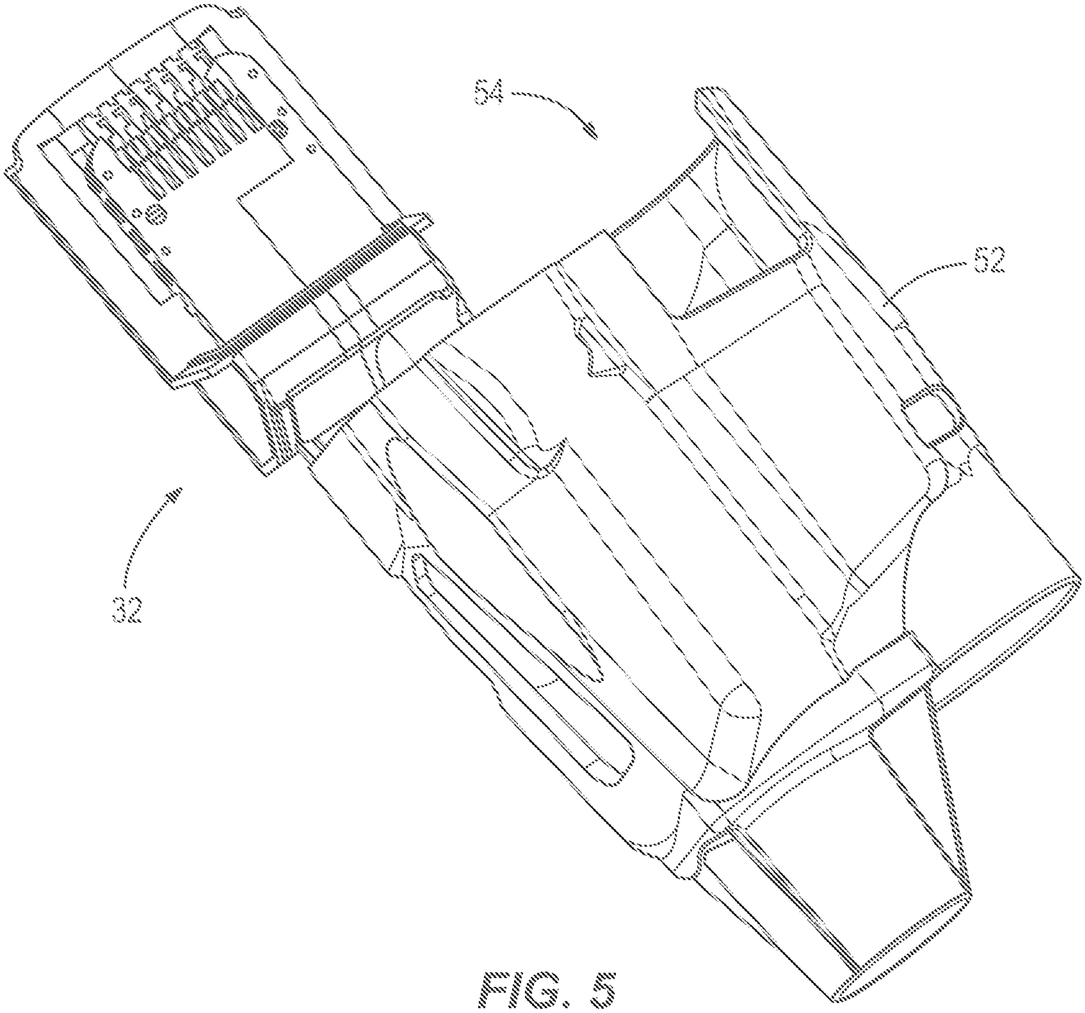
FIG. 5 is a perspective view of a portion of the handle extension of FIG. 3.

The handle extension E is selectively attachable to the driver unit N at a first end 44, and is selectively attachable to the handle unit H at a second end 46 opposite the first end 44. An elongated shaft segment 48 extends along a shaft axis 50 between the first and second ends 44, 46. In the illustrated embodiment, the shaft segment 48 extends along a fixed length to locate the nosepiece 24 near an elevated workpiece or work surface. In other embodiments (not shown), the shaft segment 48 may be adjustable (e.g., by telescoping) between a retracted position in which the nosepiece 24 can be located proximate and/or in contact with a relatively low elevated workpiece or work surface, and an extended position in which the nosepiece 24 can be located proximate and/or in contact with a relatively high elevated workpiece or work surface. A saddle 52 is affixed to the shaft segment 48 at the first end 44 and defines a nailer receptacle 54 for receiving a rear portion of the driver unit N (see also FIGS. 5 and 11). The saddle 52 includes the third coupler 32. When the handle extension E is coupled to the driver unit N, the saddle 52 supports the housing 12 of the driver unit N to provide a stable and secure connection therebetween. A fourth coupler 56 (FIG. 12), similar in construction to the first, second, and third couplers 28, 30, 32, is affixed to the saddle 52 via the shaft segment 48 and selectively engages the second coupler 30 to mechanically and electrically connect the handle extension E to the handle unit H. Electrical conductors such as wires (not shown) extend within the shaft segment 48 and electrically connect the electrical contacts of the third and fourth couplers 32, 56.

Figure 6:
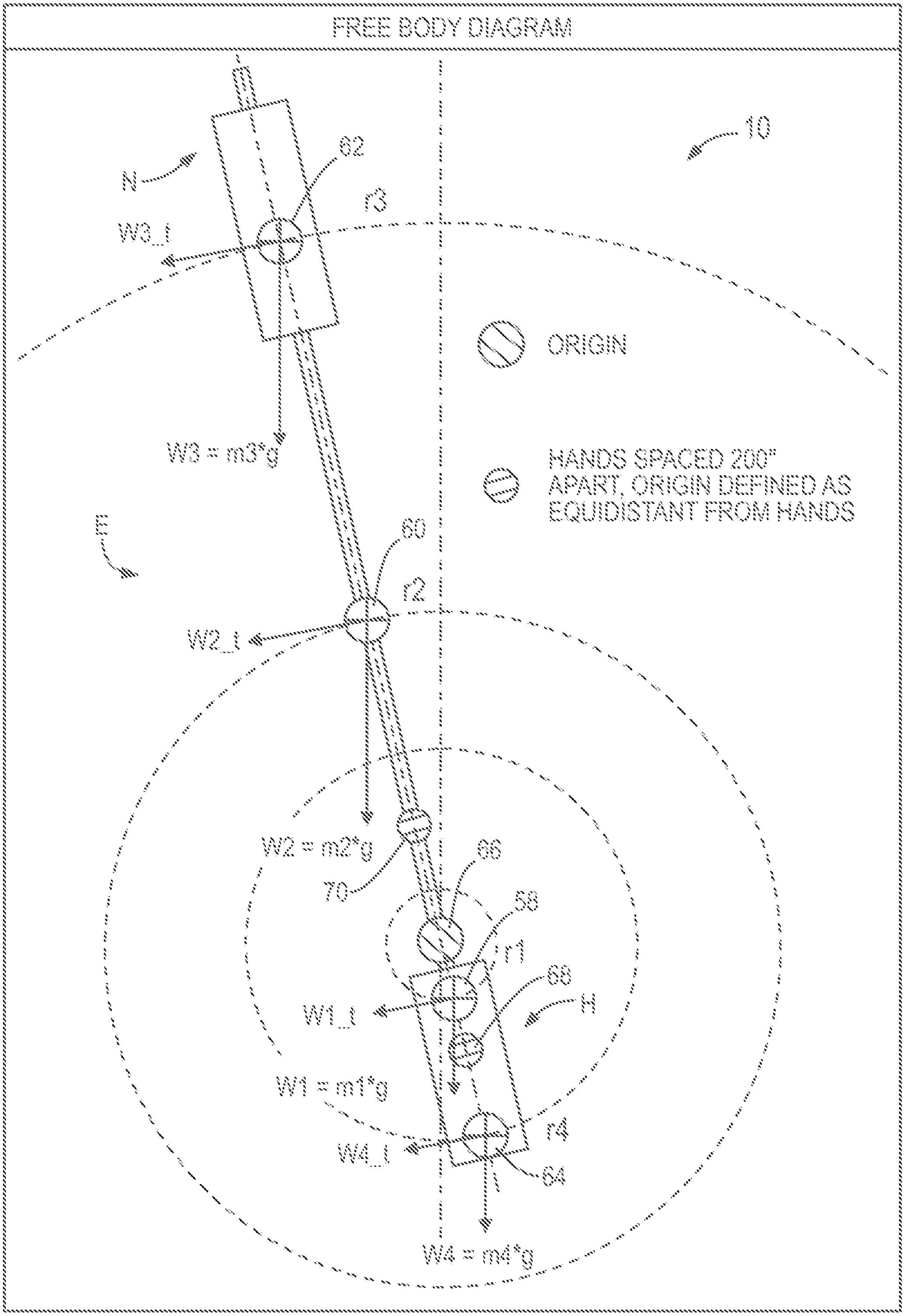
FIG. 6 is a schematic view of the powered fastener driver of FIG. 1 arranged in the second configuration.

FIG. 6 illustrates a free body diagram of the powered nailer 10 configured with the handle extension E coupled between the driver unit N and the handle unit H. The handle unit H, the handle extension E, the driver unit N, and the battery pack 42 include respective centers of gravity (CG's) 58, 60, 62, 64 which, due to the generally linear construction of the powered nailer 10, are each located generally in-line with the shaft axis 50. An origin 66 is defined equidistant from first and second gripping locations 68, 70. The powered nailer 10 rotates about an axis of rotation that passes through the origin 66. Since the handle extension E is coupled between the handle unit H and the nailer unit N, the handle unit and battery pack CG's 58, 64 are located opposite to the handle extension and nailer unit CG's 60, 62 with respect to the origin 66. This reduces the overhead weight of the powered nailer 10 when configured with the handle extension E. Moreover, moments produced about the axis of rotation by a gravitational force acting on the handle unit and battery pack CG's 58, 64 act to offset moments produced about the axis of rotation by the gravitational force acting on the handle extension and nailer unit CG's 60, 62. This helps to stabilize and balance the powered nailer 10 when configured with the handle extension E.

Figure 7:
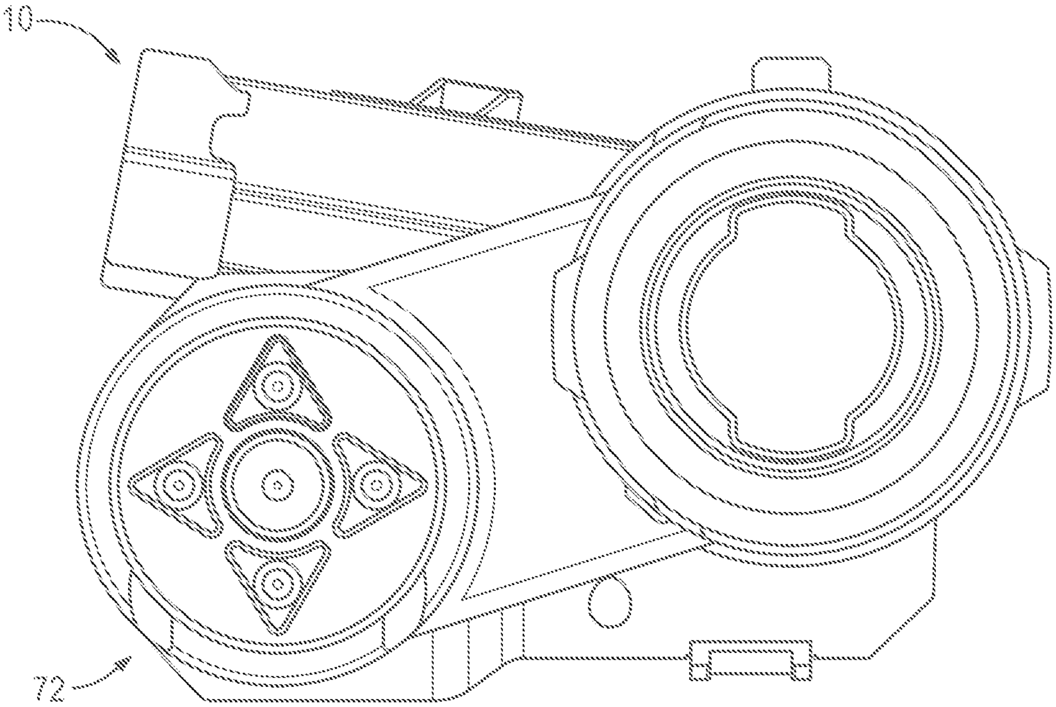
FIG. 7 is a rear view of the powered fastener driver of FIG. 1 and an alignment device.
Figure 8:
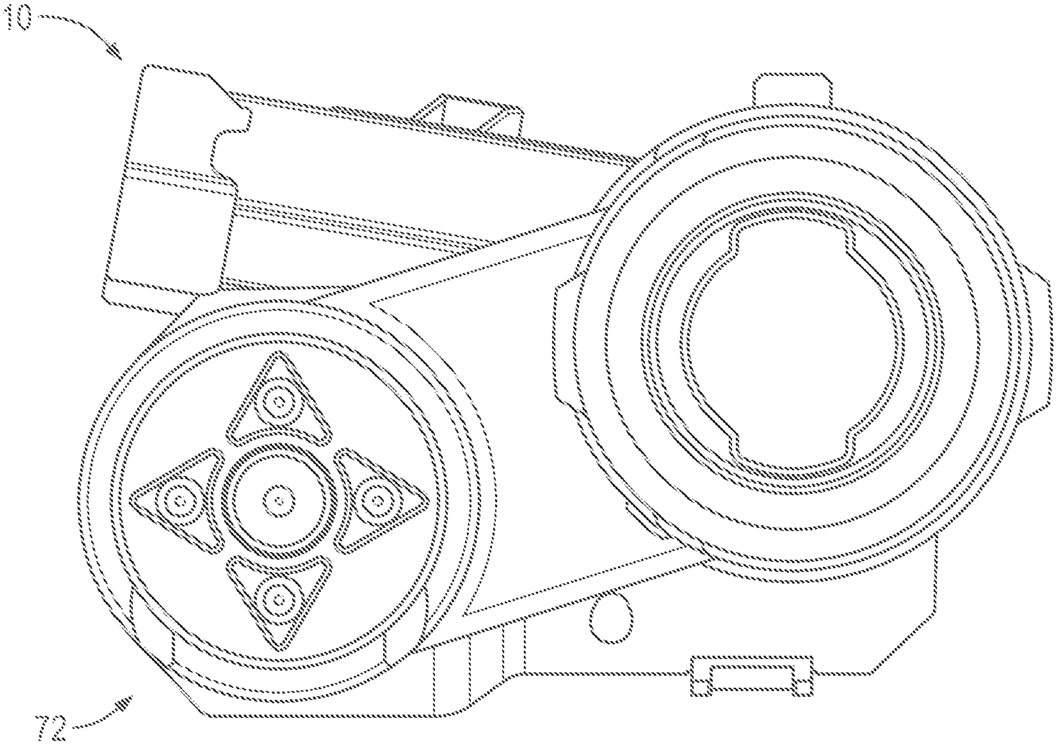
FIG. 8 is a rear view of the powered fastener driver of FIG. 1 and the alignment device.
Figure 9A:
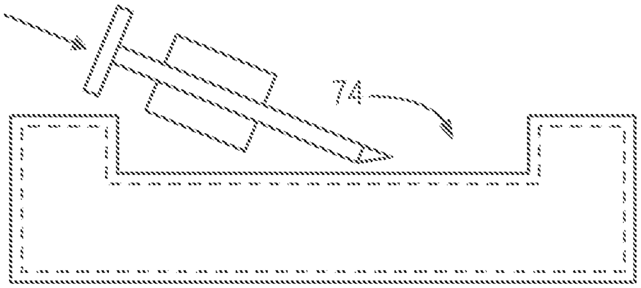
FIGS. 9A-9E are schematic views of a barrel of the powered fastener driver of FIG. 1.
Figure 9B:
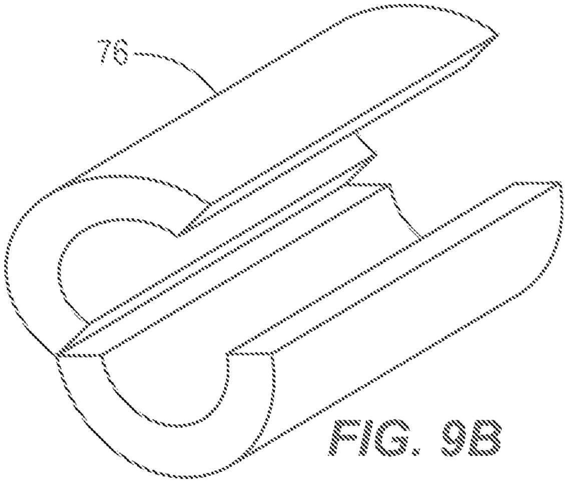
Figure 9C:
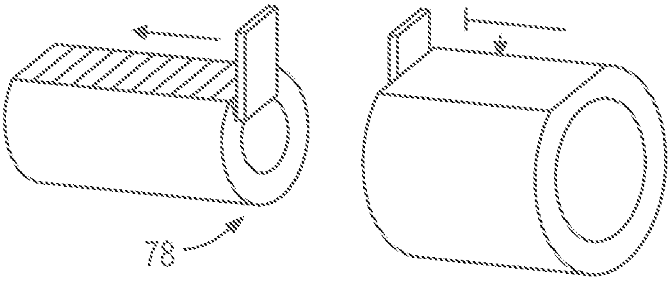
Figure 9D:
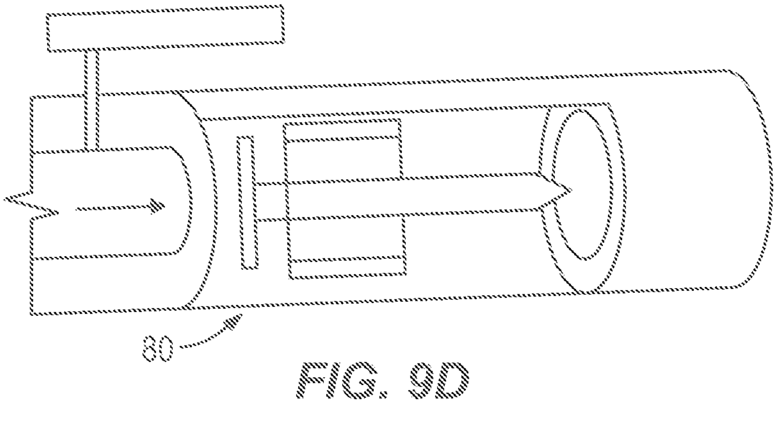
Figure 10:
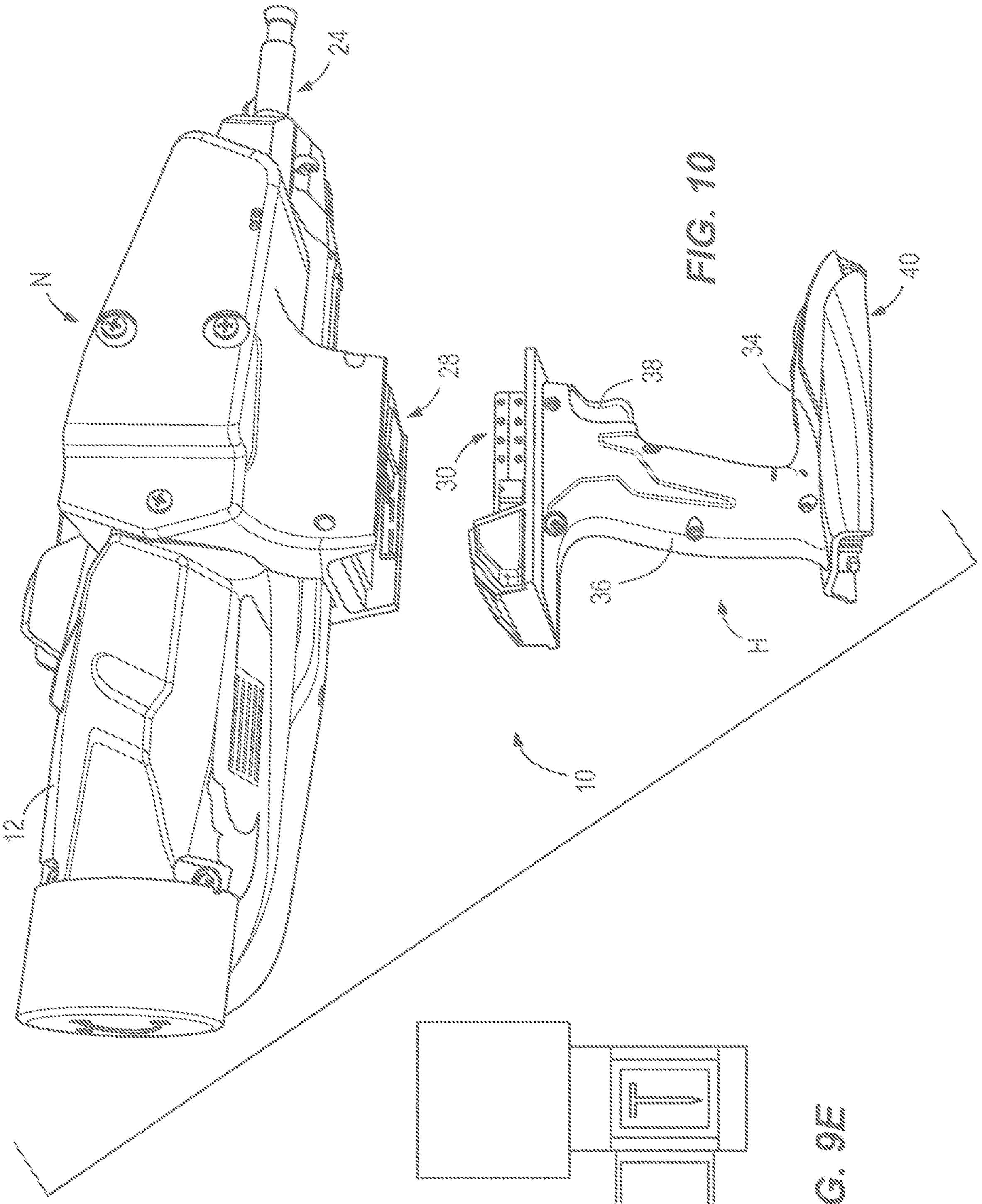
FIG. 10 is a perspective view of the driver and handle units of FIG. 3 separated from one another.
Figure 9E:
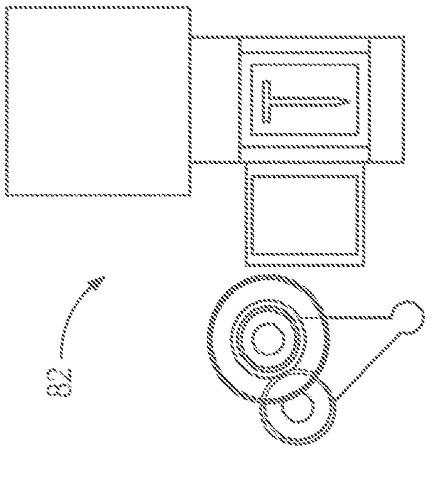
Figure 11:
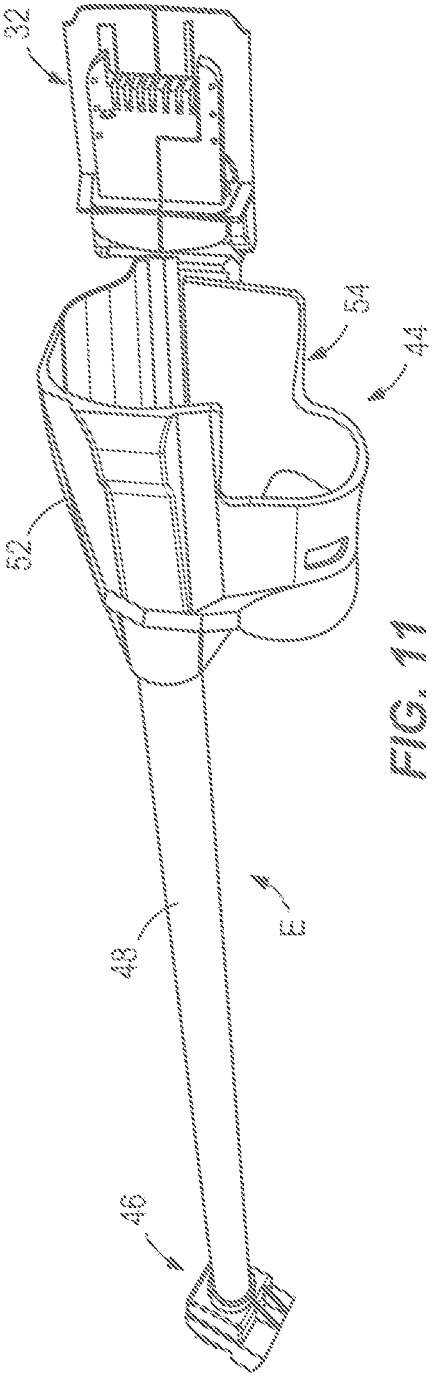
FIG. 11 is a perspective view of the handle extension of FIG. 3.
Figure 12:
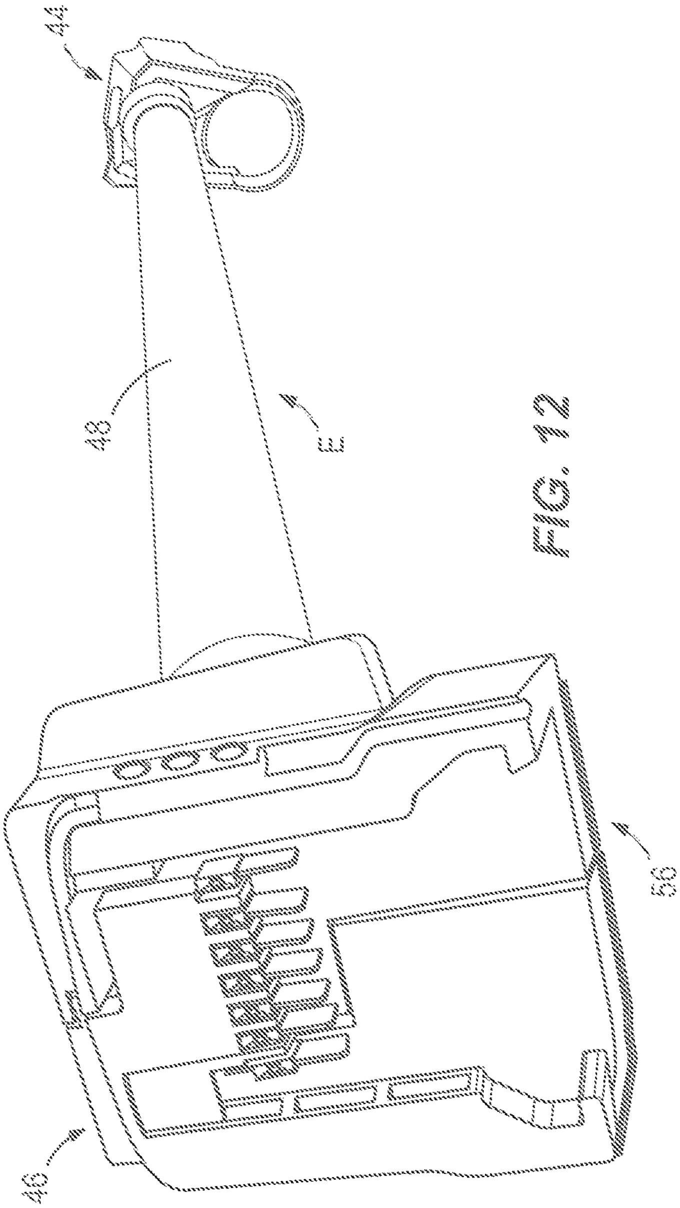
FIG. 12 is another perspective view of the handle extension of FIG. 3.
Figure 13:
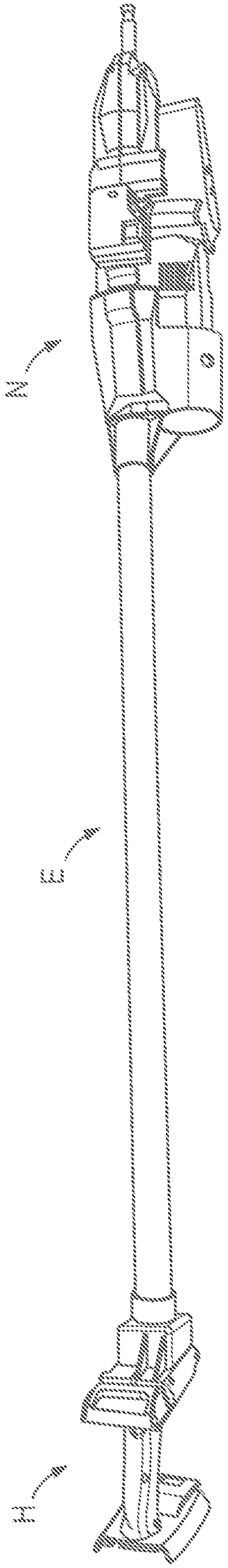
FIG. 13 is a perspective view of the powered fastener of FIG. 1 with the handle extension positioned between the driver and handle units.

One challenge is positioning the powered nailer 10 such that the nail will enter an overhead surface perpendicularly to the worksurface. With reference to FIGS. 7 and 8, in some embodiments, an alignment device includes a digital readout 72 positioned on the powered nailer 10 that indicates to a user when the powered nailer 10 is positioned in an orientation to fire nails perpendicularly to the workpiece (FIG. 7). If an orientation of the powered nailer 10 deviates too far from an acceptable range (e.g., more than +/−6 degrees) relative to a work surface, the digital readout 72 further indicates to the user a direction toward which the powered nailer 10 should be tilted to restore perpendicularity (FIG. 8). The digital readout 72 communicates with a positioning sensor (e.g., an accelerometer or gyroscope), which determines how the powered nailer 10 is oriented based on a sensed gravity vector. In some embodiments, the powered nailer 10 may be calibrated by the user by manually positioning the powered nailer 10 in an orientation perpendicular to the work surface, and then initiating a calibration process of the positioning sensor so that the digital readout will subsequently direct the user toward that desired orientation (e.g., for firing nails into angled work surfaces).

Another challenge is providing a comfortable means for inserting individual nails into the powered nailer 10. With reference to FIGS. 9A-9E, in some embodiments, the powered nailer 10 includes a slot 74 (FIG. 9A) provided in a side of a barrel of the nosepiece 24 to receive the nail. In other embodiments, the powered nailer 10 includes a hinged barrel segment 76 (FIG. 9B) that opens to receive a nail. In other embodiments, the powered nailer 10 includes a spring-loaded door 78 (FIG. 9C) that slides to reveal an opening for receiving the nail. In other embodiments, the powered nailer 10 includes a bolt mechanism 80 (FIG. 9D) for receiving the nail and positioning the nail for firing. In other embodiments, the powered nailer 10 includes a harmonica magazine 82 (FIG. 9E) for receiving the nail.

In operation, the powered nailer 10 may be adjusted between the first configuration with the handle unit H coupled to the driver unit N (FIG. 1), and in the second configuration further utilizing the handle extension E (FIGS. 2 and 13), depending on the intent of the user. To operate the powered nailer 10 in the first configuration, the first coupler 28 of the driver unit N is brought into engagement with the second coupler 30 of the handle unit H to directly couple the driver unit N to the handle unit H. A nail is loaded into the barrel, and the nosepiece 24 is positioned adjacent the workpiece or work surface and oriented perpendicular thereto. The user pulls the trigger 38, which energizes the motor and causes the nail to be fired into the workpiece or work surface.

To operate the powered nailer 10 in the second configuration, the rear portion of the driver unit N is inserted into the nailer receptacle 54 defined in the saddle 52, and the first coupler 28 is brought into engagement with the third coupler 32 to attach the handle extension E to the nailer unit N at the first end 44. The second end 46 of the handle extension E is coupled to the handle unit H by engaging the fourth coupler 56 with the second coupler 30. A nail is loaded into the barrel, and the nosepiece 24 is positioned adjacent the workpiece or work surface and oriented perpendicular thereto. The user pulls the trigger 38, which energizes the motor and causes the nail to be fired into the workpiece or work surface. Since the handle unit H is decoupled from driver unit N in the second configuration, the powered nailer 10 has a smaller profile and thus can be fit into tighter spaces to reach the work surface (e.g., between ducts, conduits, joists, or other obstructions).

Figure 14:
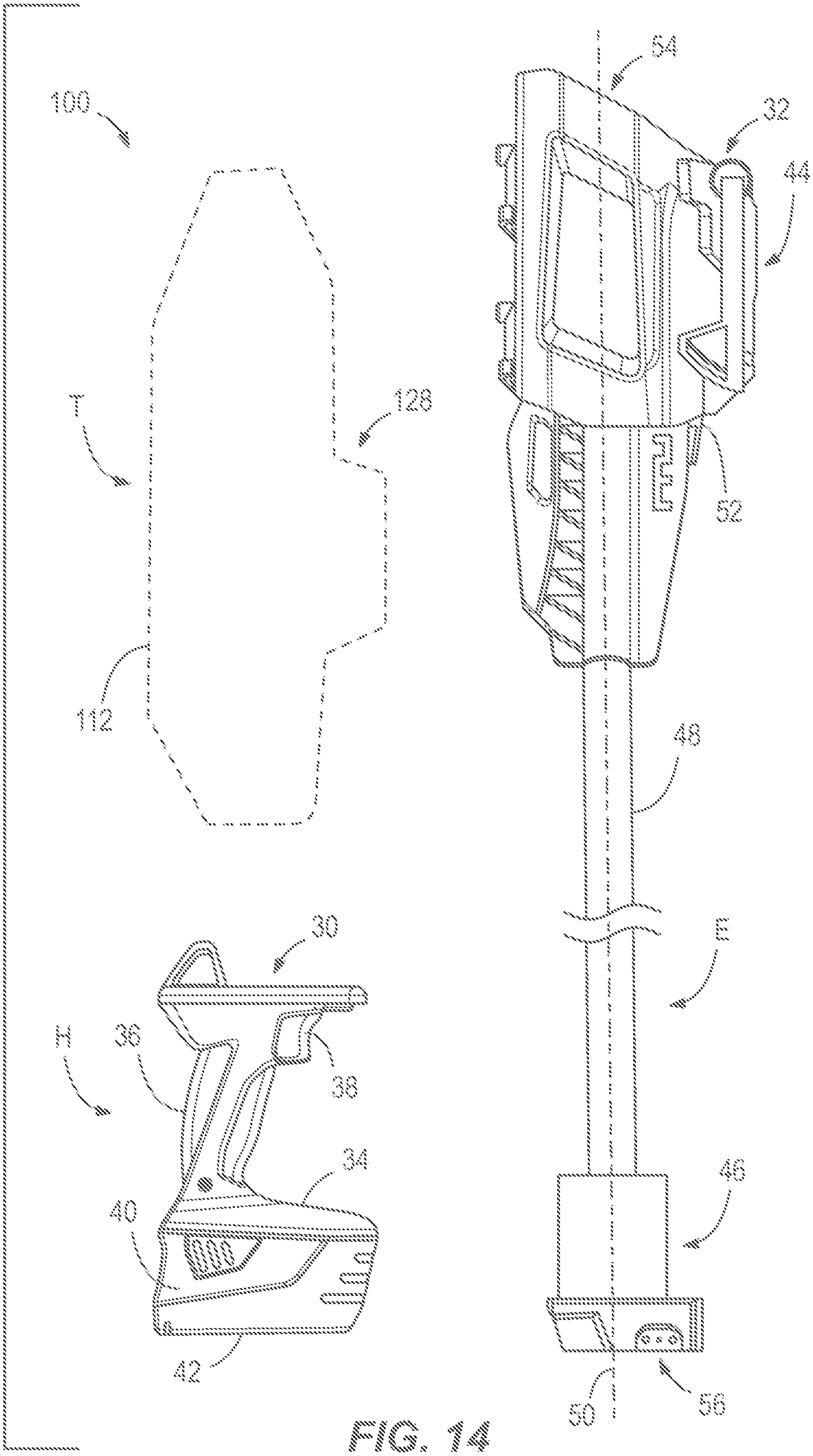
FIG. 14 is a plan view of a power tool including a tool unit, a handle unit, and a handle extension.

FIG. 14 illustrates an extendable power tool 100 according to another embodiment of the invention. The power tool 100 includes the handle unit H and the handle extension E described above with respect to the powered nailer 10. The power tool 100 further includes a tool unit T selectively and removably attachable to each of the handle unit H and the handle extension E. In some embodiments, the tool unit T includes an outdoor tool (e.g., a chain saw, a pole saw, a string trimmer, a hedge trimmer, etc.), a fastening tool (e.g., a drill, an impact driver, a hammer drill, a screwgun, etc.), a cutting tool (e.g., a reciprocating saw, an oscillating tool, a rotary tool, etc.), etc. The power tool 100 is operable in a first configuration with the handle unit H directly attached to the tool unit T. Alternatively, the power tool 100 is operable in a second configuration with the handle extension E coupled between the handle unit H and the tool unit T.

The tool unit T includes a housing 112 containing therein a motor (e.g., a brushless direct current electric motor) that supplies a motive force to operate the power tool 100. The tool unit T further includes a first coupler 128 selectively engageable with the corresponding second and third couplers 30, 32 of the handle unit N and the handle extension E, respectively. When engaged, the first and second couplers 128, 30 mechanically and electrically couple the tool unit T directly to the handle unit H in a manner similar to that described above with respect to the powered nailer 10. Likewise, the first and third couplers 128, 32 engage to mechanically and electrically couple the tool unit T directly to the handle extension E in a manner similar to that described above with respect to the powered nailer 10.

FIGS. 15-19 illustrate another powered nailer 200 according to another embodiment of the invention. The powered nailer 200 includes the handle unit H and the extension E described above with respect to the powered nailer 10. The powered nailer 200 further includes a driver unit N2 having a front-mounted motor configuration. The driver unit N2 is similar to the driver unit N and includes much of the same structure as the driver unit N. Accordingly, the following description focuses primarily on the structure and features that are different from the embodiment described above in connection with FIGS. 1-13. Features and elements that are described in connection with FIGS. 1-13 are numbered in the 200 series of reference numerals in FIGS. 15-19. It should be understood that the features of the powered nailer 200 that are not explicitly described below have the same properties as the features of the powered nailer 10.

The powered nailer 200 is operable in a first configuration with the handle unit H directly attached to the driver unit N2. Alternatively, the powered nailer 200 is operable in a second configuration with the handle extension E coupled between the handle unit H and the driver unit N2. The driver unit N2 includes a housing 212 containing therein a motor 213 (FIG. 17) (e.g., a brushless direct current electric motor) that supplies a motive force to operate the powered nailer 200. The driver unit N2 further includes a first coupler 228 selectively engageable with the corresponding second and third couplers 30, 32 of the handle unit H and the handle extension E, respectively. When engaged, the first and second couplers 228, 30 mechanically and electrically couple the driver unit N2 directly to the handle unit H in a manner similar to that described above with respect to the powered nailer 10. Likewise, the first and third couplers 228, 32 engage to mechanically and electrically couple the driver unit N2 directly to the handle extension E in a manner similar to that described above with respect to the powered nailer 10.

Figure 19:
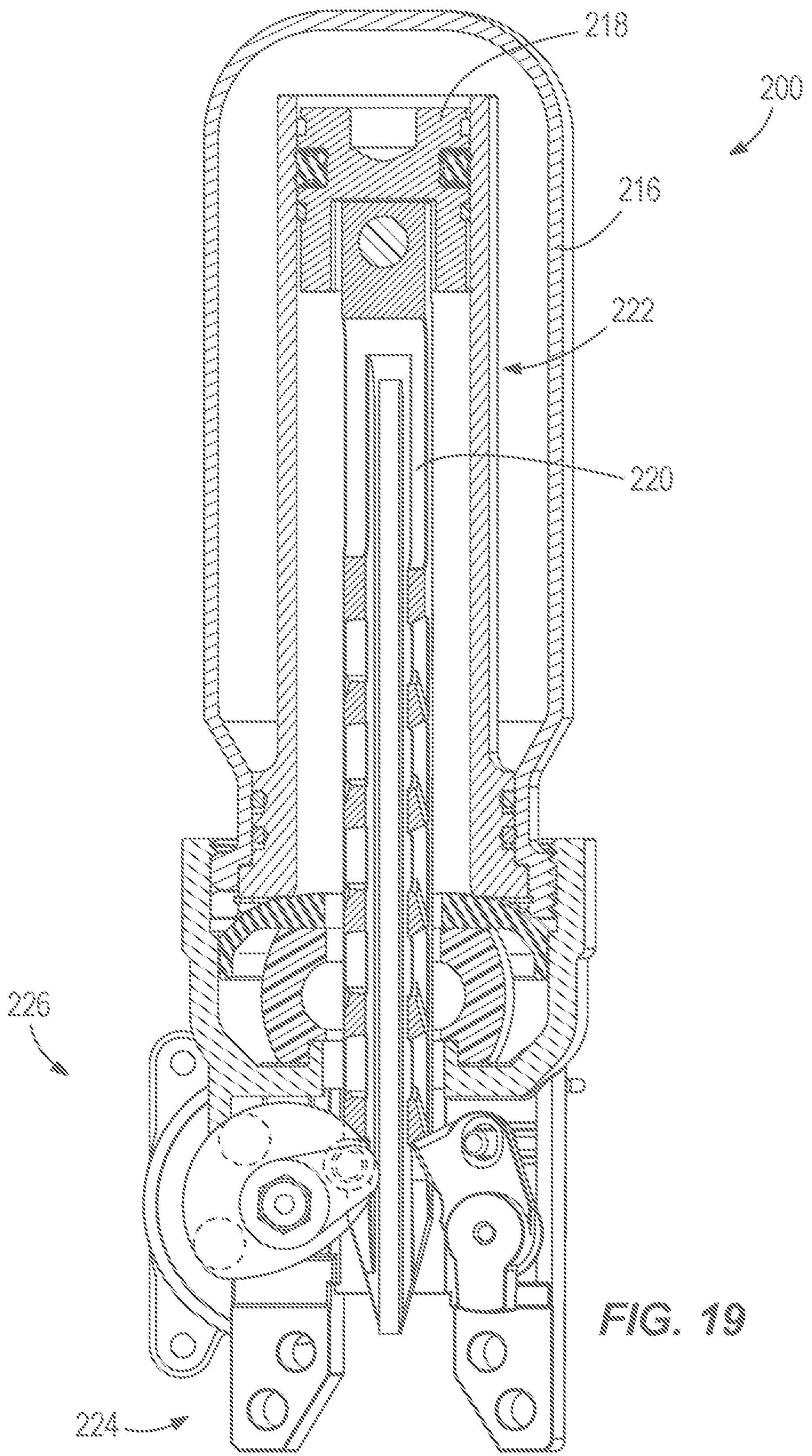
FIG. 19 is a cross-sectional view of the fastener driver of FIG. 15, taken along line 19-19 of FIG. 17.
Figure 20:
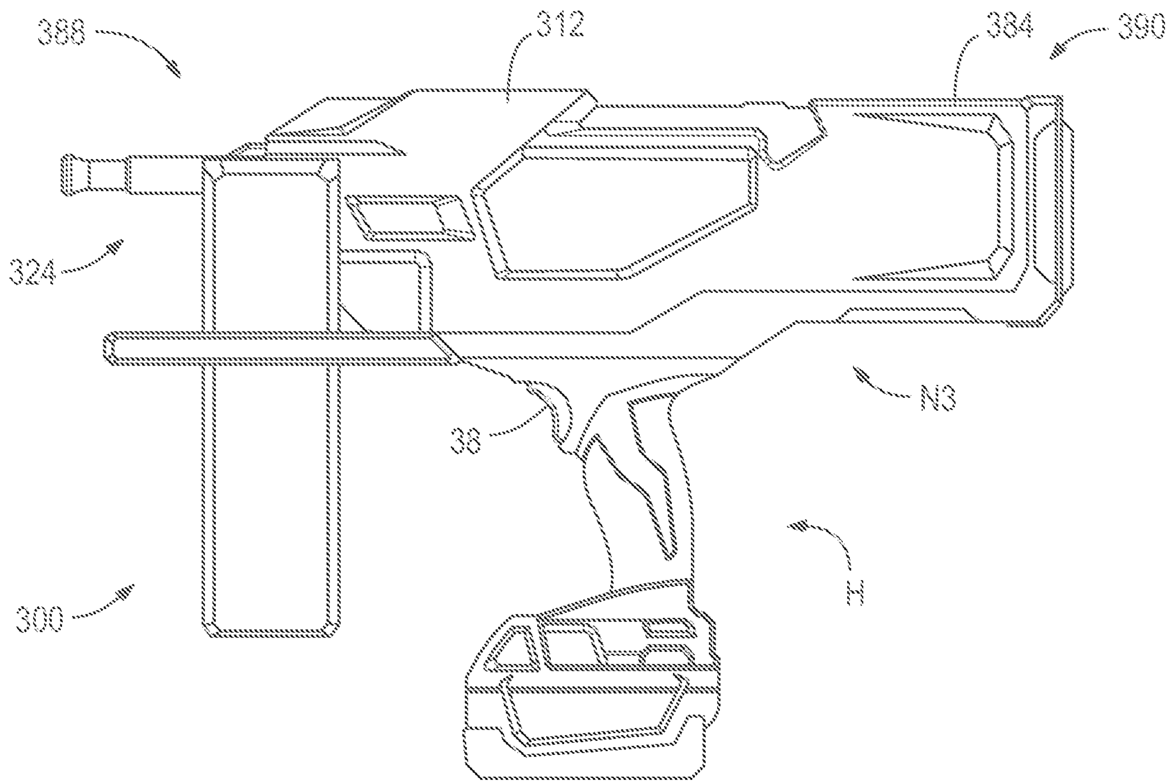
FIG. 20 is a plan view of a powered fastener driver having a rear-mounted motor configuration.

In the illustrated embodiment, the powered nailer 200 is a gas-spring powered nailer 200. With reference to FIG. 19, the housing 212 further contains a cylinder 216, a drive piston 218 located within the cylinder 216 for reciprocal movement therein, and a drive blade 220 attached to the drive piston 218. The powered nailer 200 also includes a gas spring 222 (i.e., a fixed quantity of compressed gas, such as nitrogen) within the cylinder 216 which, during a fastener driving operation, expands within the cylinder 216 to displace the drive piston 218 and the drive blade 220 toward a workpiece or work surface to drive the fastener out a nosepiece 224 and into the workpiece or work surface. The powered nailer 200 also includes a lifter mechanism 226 coupled between the motor 213 and the drive piston 218. The lifter mechanism 226 returns the drive piston 218 and drive blade 220 toward a top-dead-center position within the cylinder 216 (shown in FIG. 4), which compresses the gas spring 222 for a subsequent fastener driving operation.

Figure 15:
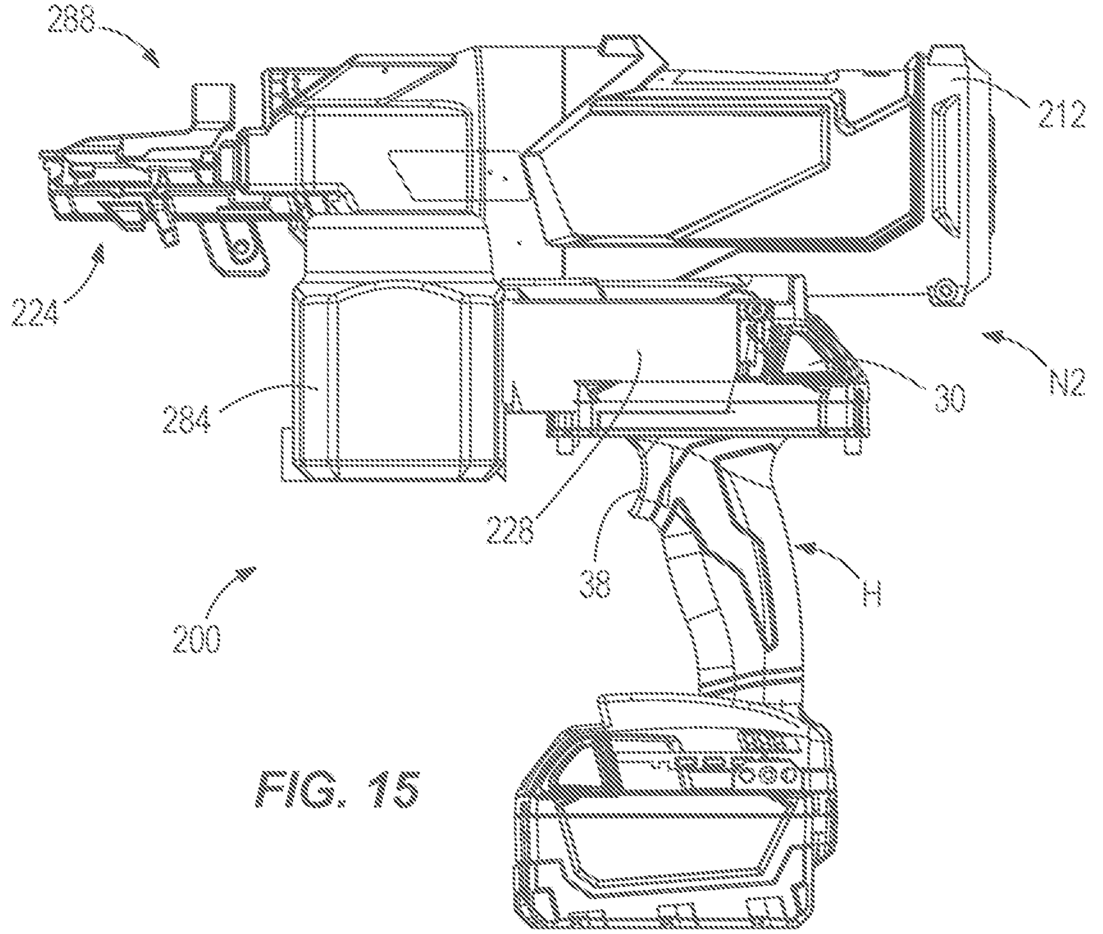
FIG. 15 is a plan view of a powered fastener driver having a front-mounted motor configuration.
Figure 16:
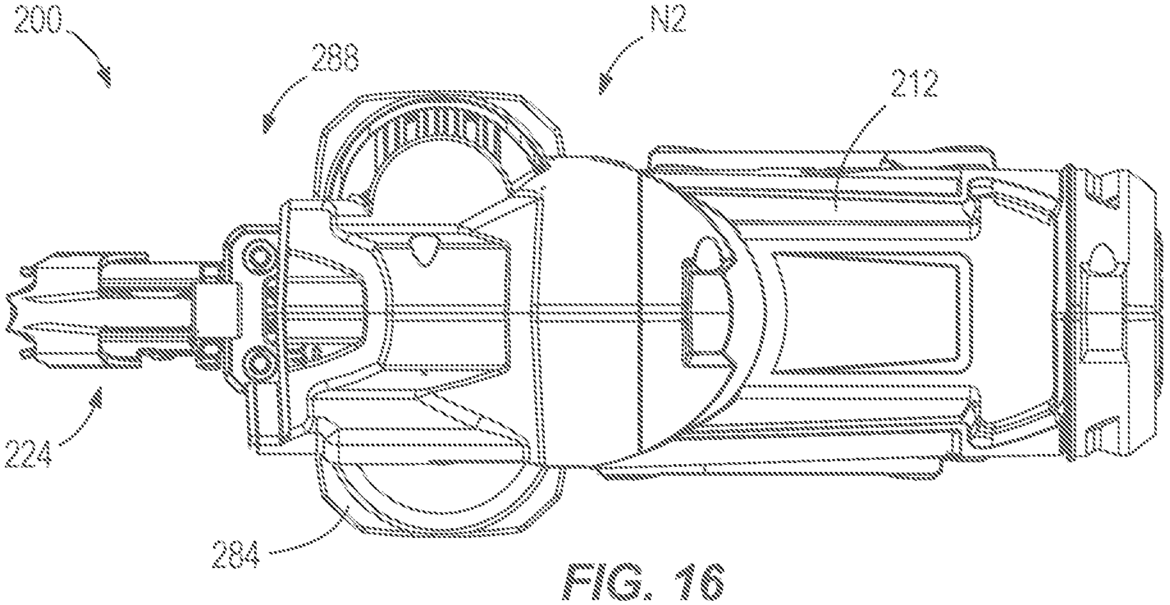
FIG. 16 is a top view of the fastener driver of FIG. 15.
Figure 17:
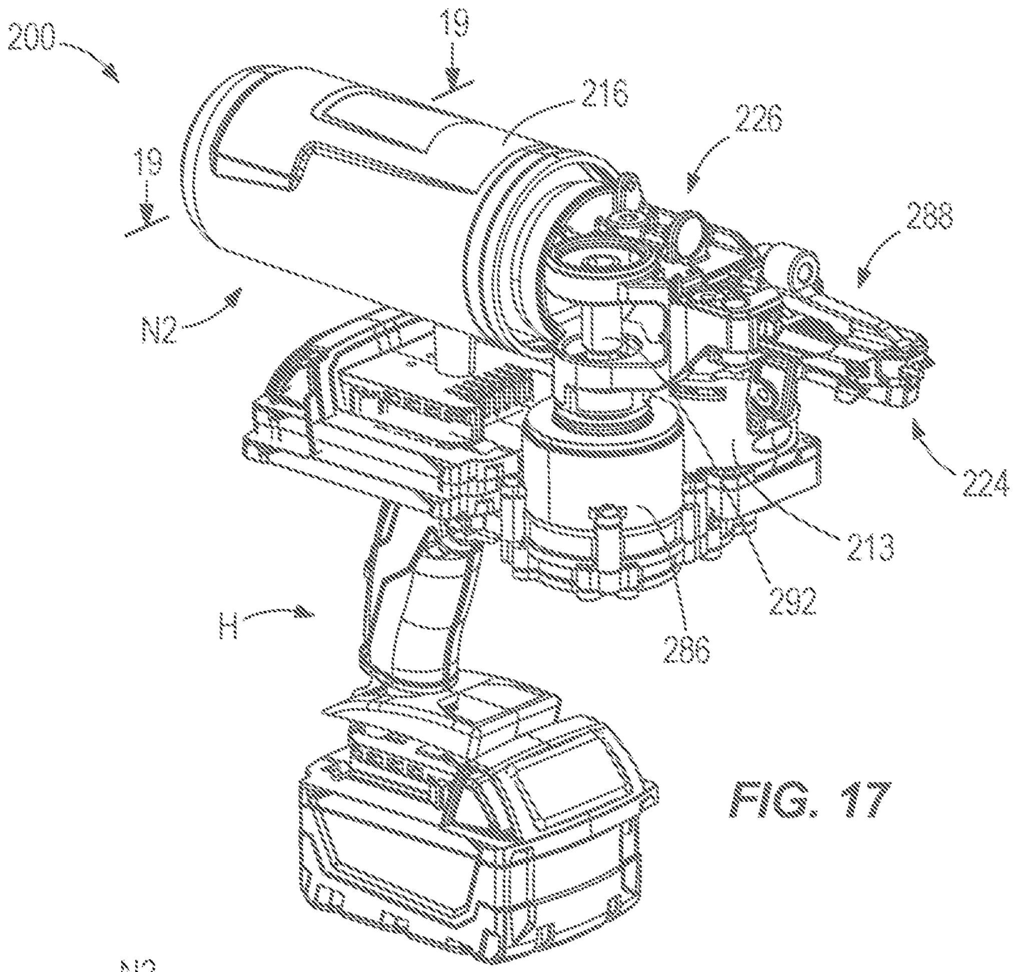
FIG. 17 is a perspective view of the fastener driver of FIG. 15 with portions removed.

With reference to FIGS. 15-17, the housing 212 includes a motor housing portion 284, located adjacent the nosepiece 224, in which the motor 213 and a transmission 286 are at least partially positioned. Thus, the motor 213 and the transmission 286 are located proximate a front end 288 of the driver unit N2. The transmission 286 rotatably couples to a motor output shaft (not shown), and includes a transmission output shaft 292 extending to the lifter mechanism 226 to move the drive blade 220 to the top-dead-center position. When the user pulls the trigger 38 of the handle unit H, the motor 213 is energized and causes the nail to be fired into the workpiece or work surface.

Figure 18:
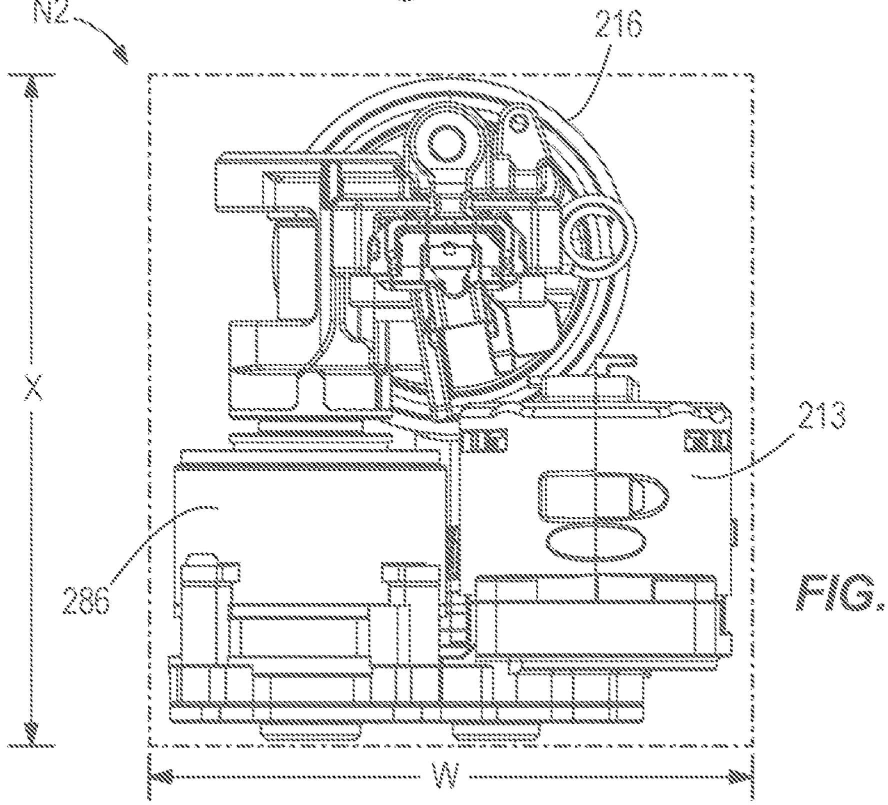
FIG. 18 is a rear view of the fastener driver of FIG. 15 with portions removed.

FIG. 18 is a front view illustrating the driver unit N2 with the housing 212 removed. A width W of the driver unit N2, measured in a lateral or side-to-side direction as shown in FIG. 18, is approximately five inches. A height X of the driver unit N2, measured in a vertical or top-to-bottom direction as shown in FIG. 18, is somewhat more than five inches (i.e., approximately six inches). The driver unit N2 accordingly has a form factor F of approximately five inches by six inches. When obstacles are present near the workpeice (e.g., ducts, pipes, beams, dropped ceiling frames, etc.), the relatively small form factor F of the driver unit N2 allows the driver unit N2 to fit into spaces measuring approximately five inches by six inches.

FIGS. 20-24 illustrate another powered nailer 300 according to another embodiment of the invention. The powered nailer 300 includes the handle unit H and the extension E described above with respect to the powered nailer 10. The powered nailer 300 further includes a driver unit N3 having a rear-mounted motor configuration. The driver unit N3 is similar to the driver unit N and includes much of the same structure as the driver unit N. Accordingly, the following description focuses primarily on the structure and features that are different from the embodiment described above in connection with FIGS. 1-13. Features and elements that are described in connection with FIGS. 1-13 are numbered in the 300 series of reference numerals in FIGS. 20-24. It should be understood that the features of the powered nailer 300 that are not explicitly described below have the same properties as the features of the powered nailer 10.

The powered nailer 300 is operable in a first configuration with the handle unit H directly attached to the driver unit N3. Alternatively, the powered nailer 300 is operable in a second configuration with the handle extension E coupled between the handle unit H and the driver unit N3. The driver unit N3 includes a housing 312 containing therein a motor 313 (e.g., a brushless direct current electric motor) that supplies a motive force to operate the powered nailer 300. The driver unit N3 further includes a first coupler 328 selectively engageable with the corresponding second and third couplers 30, 32 of the handle unit H and the handle extension E, respectively. When engaged, the first and second couplers 328, 30 mechanically and electrically couple the driver unit N3 directly to the handle unit H in a manner similar to that described above with respect to the powered nailer 10. Likewise, the first and third couplers 328, 32 engage to mechanically and electrically couple the driver unit N3 directly to the handle extension E in a manner similar to that described above with respect to the powered nailer 10.

Figure 24:
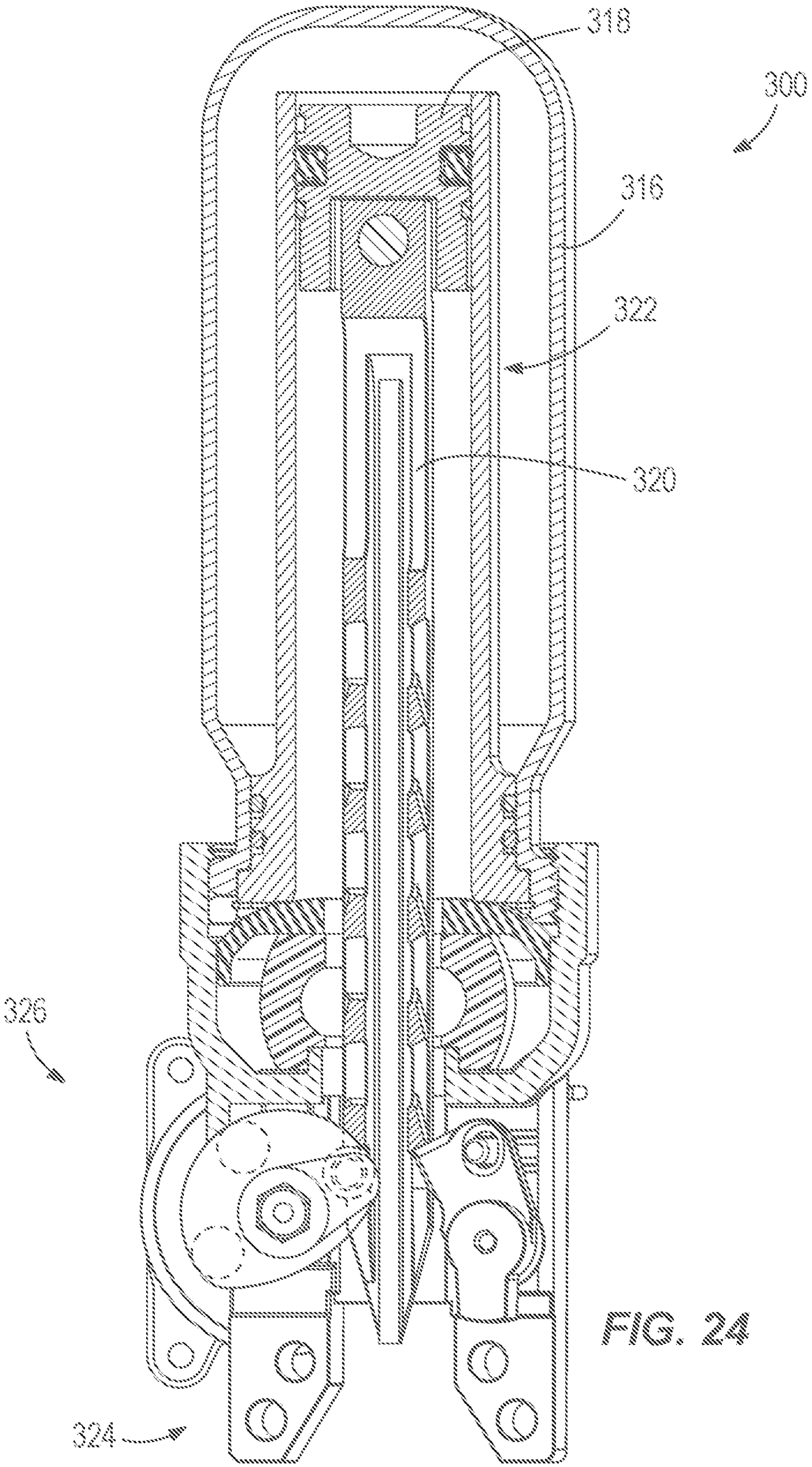
FIG. 24 is a cross-sectional view of the fastener driver of FIG. 20, taken along line 24-24 of FIG. 22.

In the illustrated embodiment, the powered nailer 300 is a gas-spring powered nailer 300. With reference to FIG. 24, the housing 312 further contains a cylinder 316, a drive piston 318 located within the cylinder 316 for reciprocal movement therein, and a drive blade 320 attached to the drive piston 318. The powered nailer 300 also includes a gas spring 322 (i.e., a fixed quantity of compressed gas, such as nitrogen) within the cylinder 316 which, during a fastener driving operation, expands within the cylinder 316 to displace the drive piston 318 and the drive blade 320 toward a workpiece or work surface to drive the fastener out a nosepiece 324 and into the workpiece or work surface. The powered nailer 300 also includes a lifter mechanism 326 coupled between the motor 313 and the drive piston 318. The lifter mechanism 326 returns the drive piston 318 and drive blade 320 toward a top-dead-center position within the cylinder 316 (shown in FIG. 24), which compresses the gas spring 322 for a subsequent fastener driving operation.

Figure 21:
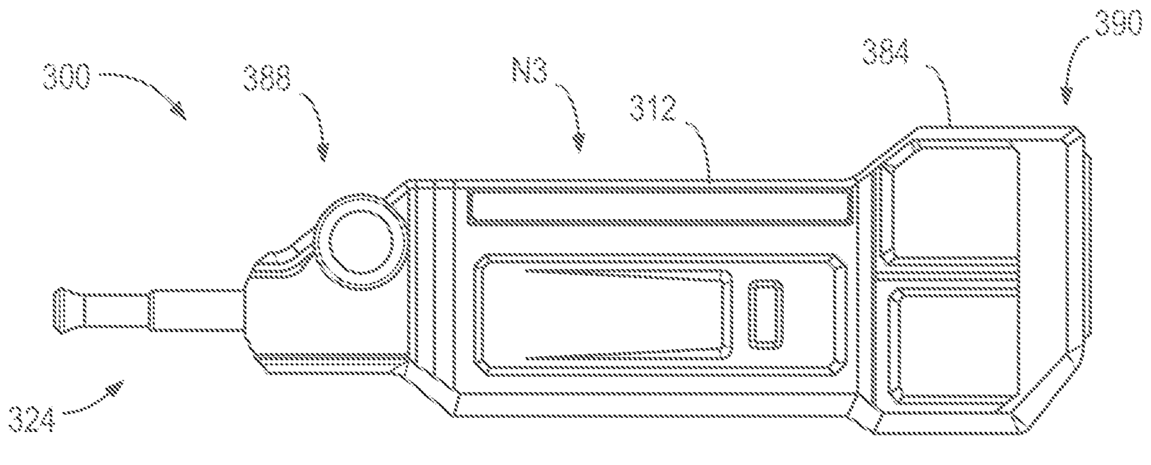
FIG. 21 is a top view of the fastener driver of FIG. 20.
Figure 22:
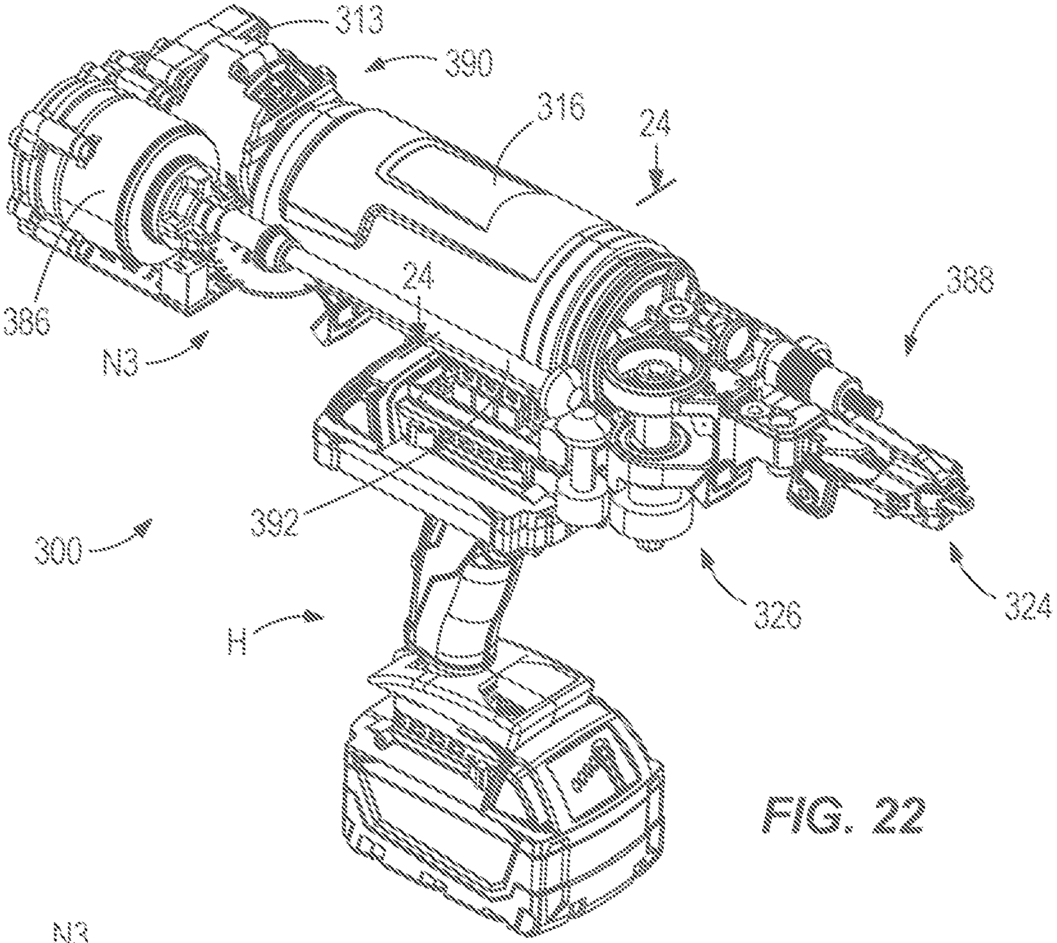
FIG. 22 is a perspective view of the fastener driver of FIG. 20 with portions removed.

With reference to FIGS. 21 and 22, the housing 312 includes a motor housing portion 384, located behind the cylinder 316 and opposite the nosepiece 324, in which the motor 313 and a transmission 386 are at least partially positioned. Thus, the nosepiece 324 is located at a front end 388 of the driver unit N3, whereas the motor 313 and the transmission 386 are located proximate a rear end 390 of the driver unit N3 opposite the front end 388. The transmission 386 rotatably couples to a motor output shaft (not shown), and includes a transmission output shaft 392 extending to the lifter mechanism 326 to move the drive blade 320 to the top-dead-center position. When the user pulls the trigger 38 of the handle unit H, the motor 313 is energized and causes the nail to be fired into the workpiece or work surface.

Figure 23:
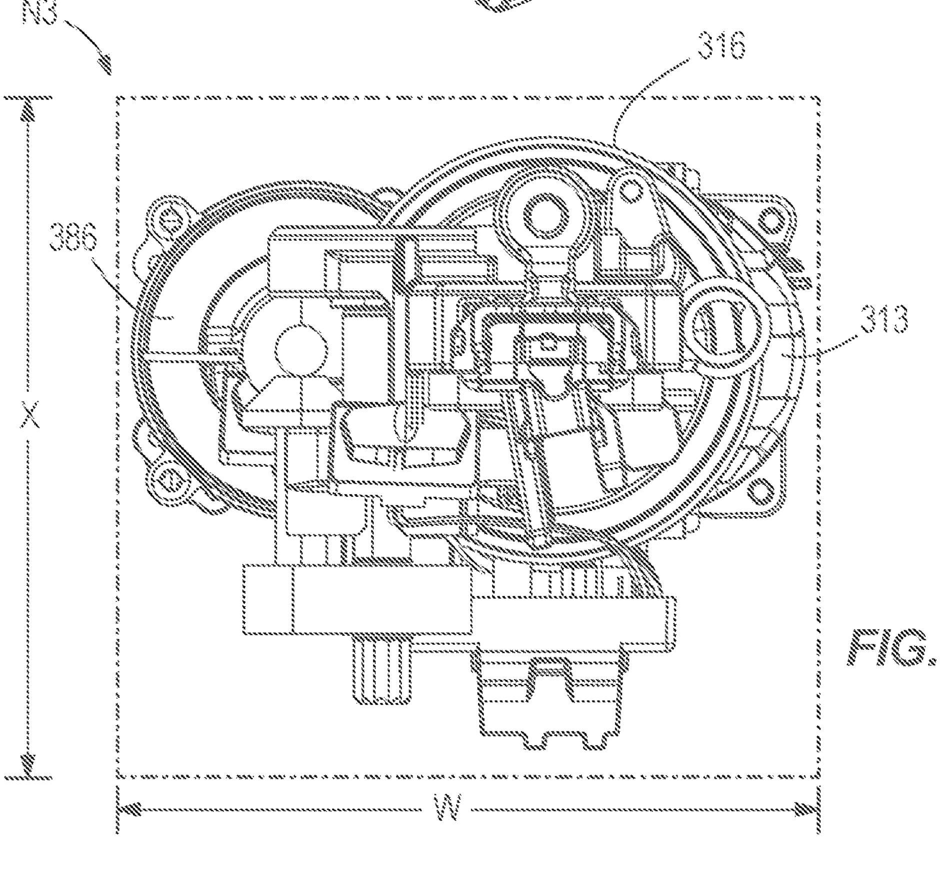
FIG. 23 is a rear view of the fastener driver of FIG. 20 with portions removed.

FIG. 23 is a front view illustrating the driver unit N3 with the housing 312 removed. A width W of the driver unit N3, measured in a lateral or side-to-side direction as shown in FIG. 23, is approximately five inches. A height X of the driver unit N3, measured in a vertical or top-to-bottom direction as shown in FIG. 23, is also approximately five inches. The driver unit N3 accordingly has a form factor F of approximately five inches by five inches. The form factor F of the driver unit N3 is reduced as compared to that of the driver unit N2 described above, due to the rear-mounted motor and transmission configuration. When obstacles are present near the workpiece (e.g., ducts, pipes, beams, dropped ceiling frames, etc.), the relatively small form factor F of the driver unit N3 allows the driver unit N3 to fit into spaces measuring approximately five inches by five inches.

Figure 25:
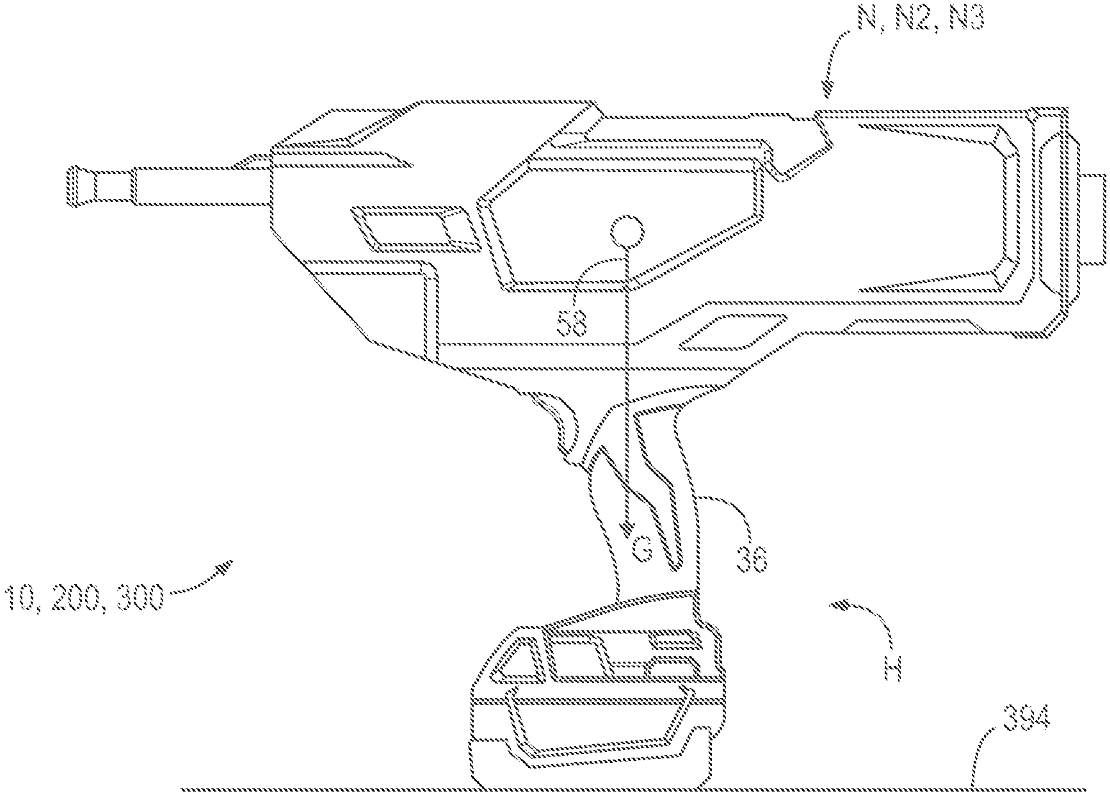
FIG. 25 is a plan view of a powered fastener driver.

FIG. 25 illustrates the powered nailer 10, 200, 300 arranged in the first configuration with the handle unit H directly attached to the driver unit N, N2, N3, and oriented at an address position relative to a ground plane 394. In some embodiments, when thus arranged, the gripping portion 36 of the handle unit H is located below and aligned with the center of gravity (CG) 58 of the driver unit N, N2, N3. That is, it will be appreciated that a gravity vector G originating from the CG 58 of the driver unit N, N2, N3 will pass through the gripping portion 36 as shown in FIG. 25 when the powered nailer 10, 200, 300 is thus arranged.

Figure 26:
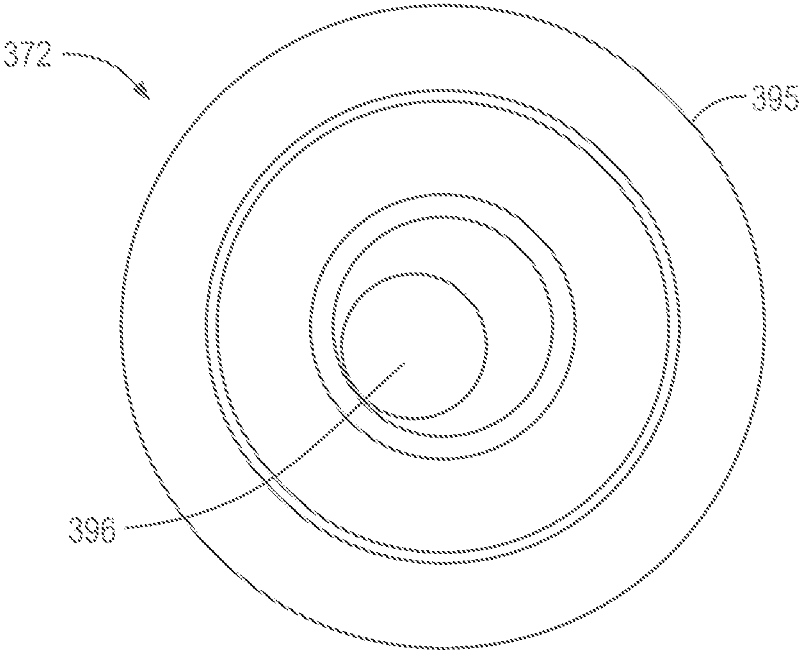
FIG. 26 is a view of another alignment device.

FIG. 26 illustrates a digital readout 372 that may be positioned on the powered nailer 10, 200, 300 according to another embodiment of the invention. The digital readout 372 is similar to the digital readout 72 (FIGS. 7 and 8) described above with respect to the powered nailer 10. It will be appreciated that the digital readout 372 is operable with the alignment device described above with respect to the powered nailer 10, and indicates to a user when the nailer 10, 200, 300 is positioned in an orientation to fire nails perpendicularly to the workpiece. The digital readout 372 is provided as a screen 395 capable of displaying a visual indicator 396. If an orientation of the powered nailer 10, 200, 300 deviates too far from an acceptable range (e.g., more than +/−6 degrees) relative to a work surface, the digital readout 72 further indicates to the user a direction toward which the powered nailer 10 should be tilted to restore perpendicularity.

Figure 27:
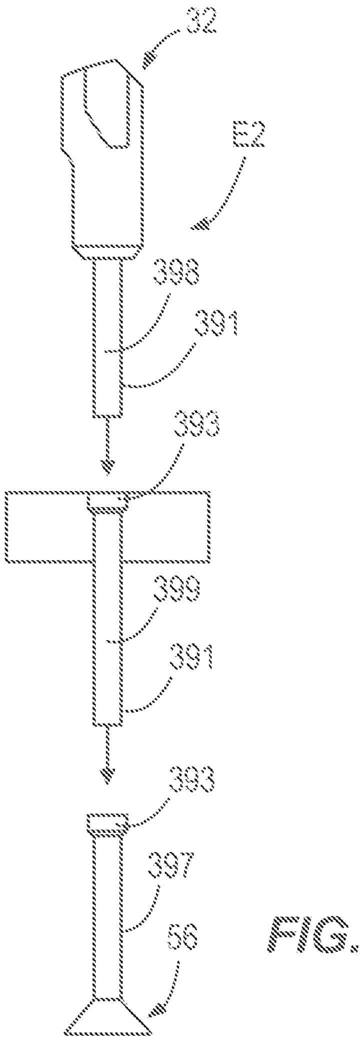
FIG. 27 is a schematic view of a handle extension.
Figure 28:
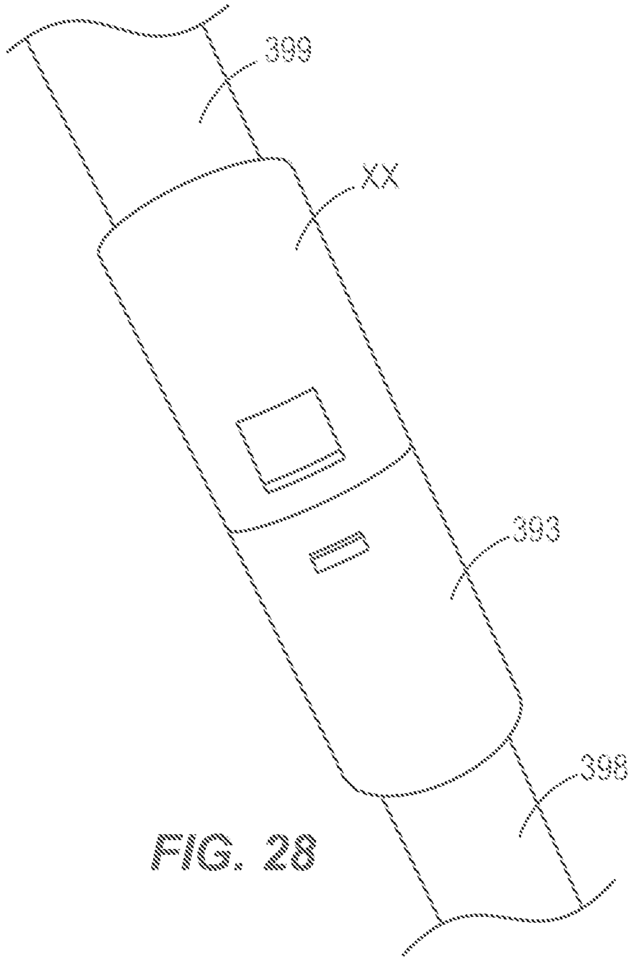
FIG. 28 is a perspective view of a portion of the handle extension of FIG. 27.
Figure 29:
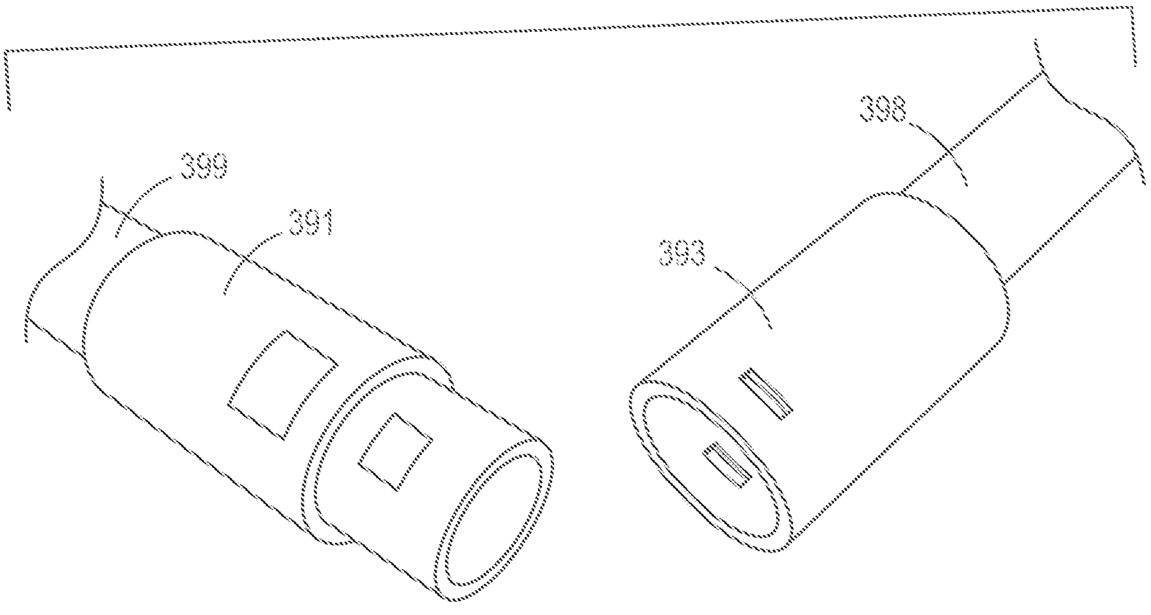
FIG. 29 is another perspective view of a portion of the handle extension of FIG. 27.

FIGS. 27-29 illustrate another handle extension E2 that can be used in the powered nailers 10, 200, 300, or in the power tool 100, in place of the handle extension E. The handle extension E2 includes the same features that are described above relative to the handle extension E, and further includes a number of modular pole sections including a handle-end pole section 397, a tool-end pole section 398 attachable to the handle-end pole section 397, and one or more intermediate pole sections 399 attachable intermediate the handle-end and tool-end pole sections 397, 398. Multiple intermediate pole sections 399 may be inserted between the handle-end and tool-end pole sections 397, 398 to allow for different lengths of extension of the powered nailers 10, 200, 300, and the power tool 100. The pole sections 397, 398, 399 are electrically connectable to one another to permit the transmission of electrical power and communication signals between the handle unit H and the driver units N, N2, N3 or the tool unit T.

With continued reference to FIGS. 27-29, in some embodiments, each pole section 397, 398, 399 includes at least one of a terminal block 391 and a terminal block receiver 393 engageable with other corresponding terminal blocks 391. Specifically, in some embodiments, the handle-end pole section 397 includes a terminal block receiver 393, the tool-end pole section 398 includes a terminal block 391, and each intermediate pole section 399 includes each of a terminal block 391 and a terminal block receiver 393 disposed at opposite ends thereof. It will be appreciated that the arrangement may be reversed such that the handle-end pole section 397 includes a terminal block 391 and the tool-end pole section 398 includes a terminal block receiver 393. Each terminal block receiver 393 can receive the terminal block of another pole segment to transmit electrical power to the adjacent pole section, to the handle unit H, or to the driver unit N, N2, N3 or the tool unit T. In some embodiments, the pole sections 397, 398, 399 can be mechanically and electrically connected to other pole sections, the handle unit H, or the driver unit N, N2, N3 or the tool unit T in a single motion.

Figure 30:
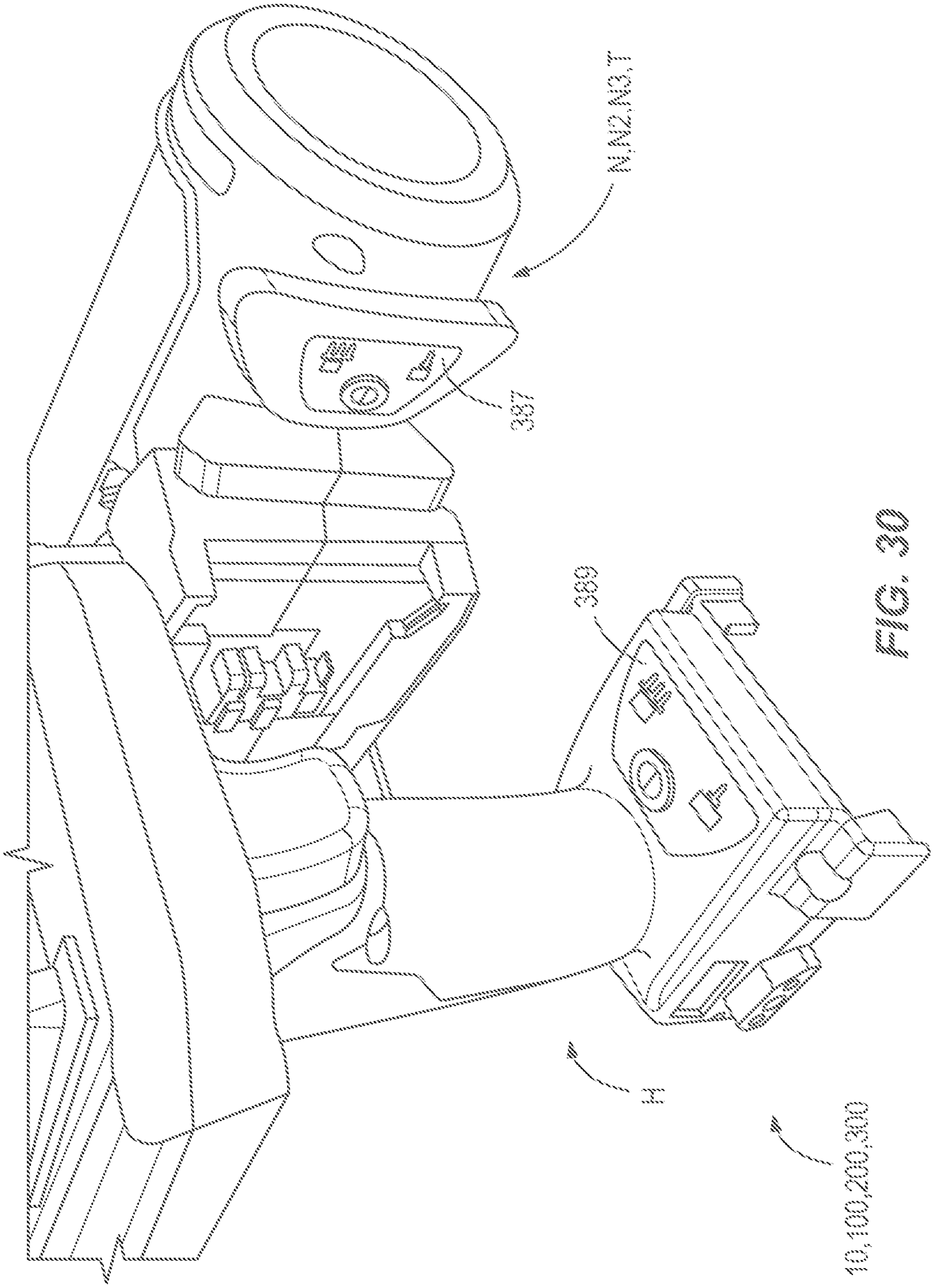
FIG. 30 is a perspective view of a portion of the fastener driver of FIG. 1 including first and second on/off switches.

With reference to FIG. 30, in some embodiments, each of the powered nailers 10, 200, 300 and the power tool 100 includes an onboard or first on/off switch 387 provided directly on the driver unit N, N2, N3, or the tool unit T, respectively. In such embodiments, the powered nailers 10, 200, 300 and the power tool 100 also include a remote or second on/off switch 389 provided on the handle unit H. The powered nailers 10, 200, 300 and the power tool 100 can thus be powered on or powered off locally via the first on/off switch 387, or remotely via the second on/off switch 389.

Figure 31:
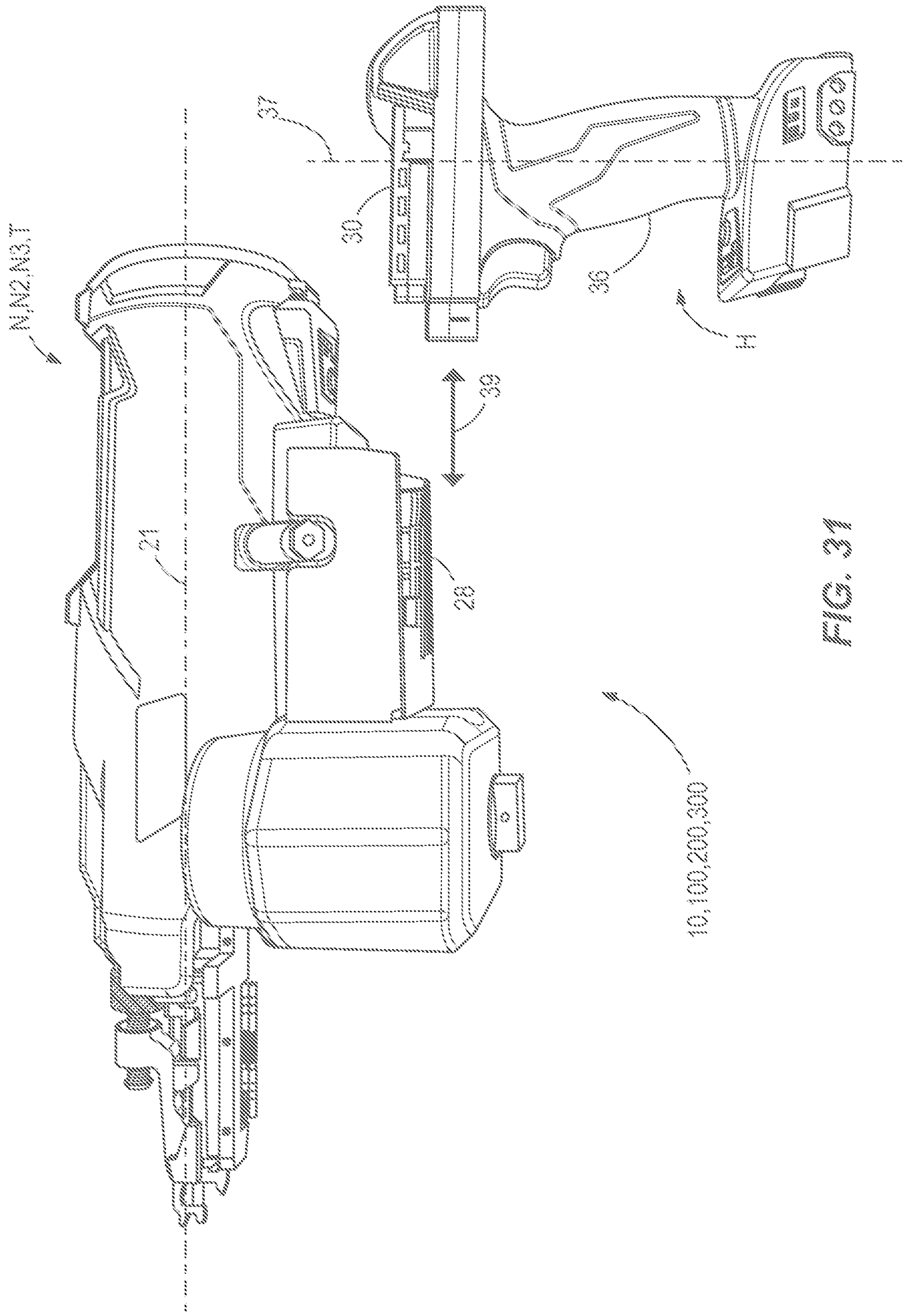
FIG. 31 is a plan view of portions of the fastener driver of FIG. 1.
Figure 32:
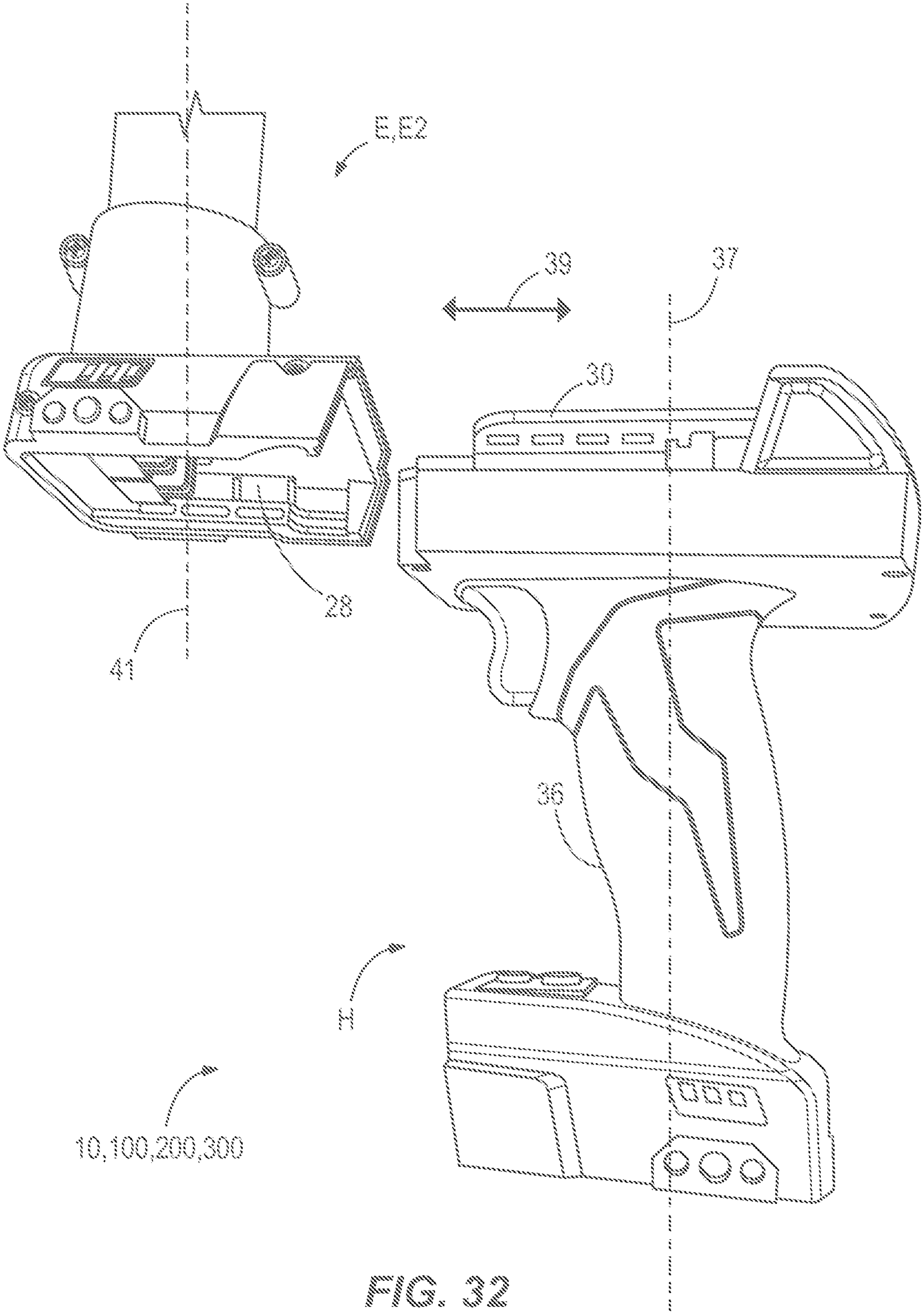
FIG. 32 is a plan view of portions of the fastener driver of FIG. 1.

With reference to FIGS. 31 and 32, in some embodiments of the powered nailer 10, the drive blade 20 (FIG. 4) of the driver unit N moves along a drive blade axis 21 (FIG. 31). The gripping portion 36 of the handle unit H defines a handle axis 37 that extends orthogonal to the drive blade axis 21 when the powered nailer 10 is arranged in the first configuration (i.e., with the handle unit H directly attached to the driver unit N (FIG. 1)). To engage the first coupler 28 with the second coupler 30, and thereby connect the handle unit H to the driver unit N, the handle unit H is moved relative to the driver unit N along a mounting direction 39 indicated by the arrow shown in FIG. 31. The mounting direction 39 is generally parallel to the drive blade axis 21.

With continued reference to FIG. 32, in some embodiments of the powered nailer 10, the handle extension E generally extends along a pole axis 41. When the powered nailer 10 is arranged in the second configuration (i.e., with the handle extension E coupled between the handle unit H and the driver unit N (FIG. 2)), the handle axis 37 of the handle unit H extends parallel to the pole axis 41 and to the drive blade axis 21. To engage the first coupler 28 with the fourth coupler 56, and thereby connect the handle unit H to the handle extension E, the handle unit H is moved relative to the handle extension E along the mounting direction 39 orthogonal to the drive blade axis 21 (FIG. 31). It will be appreciated that the above description relating to the mounting direction 39 and drive blade axis 21 applies with equal weight to the powered nailers 200, 300 described above.

In some embodiments, the powered nailers 10, 200, 300 deliver at least 230 joules of kinetic energy while the gas contained within the spring (e.g., gas spring 22) has a pressure of 166 pounds per square inch (psi) or less. In other embodiments, the powered nailers 10, 200, 300 deliver at least 200 joules of kinetic energy while the gas contained within the spring (e.g., gas spring 22) has a pressure of 175 psi or less.

Figure 35:
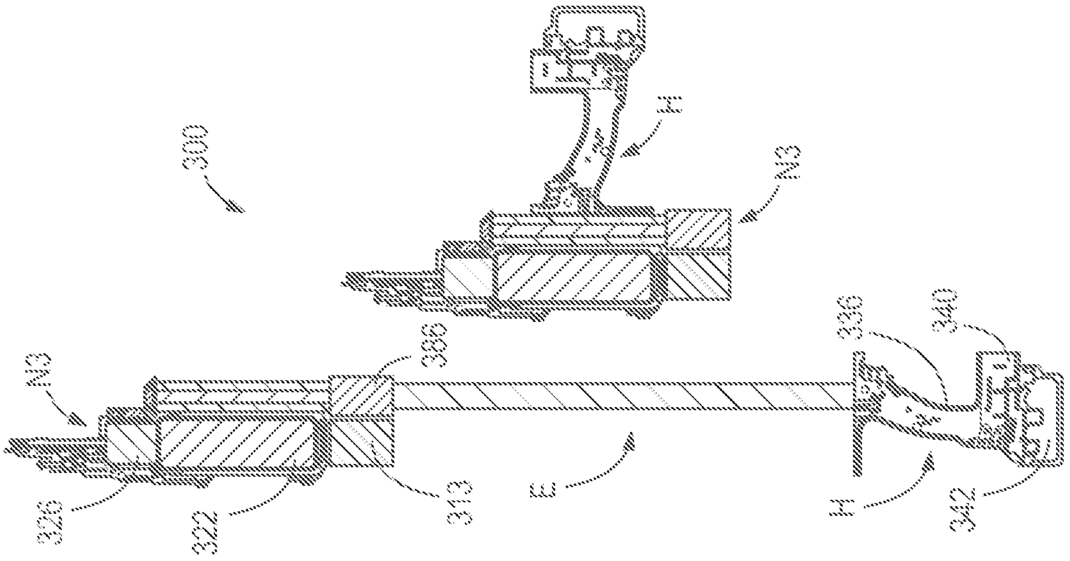
FIG. 35 is a schematic view of the fastener driver of FIG. 20.
Figure 34:
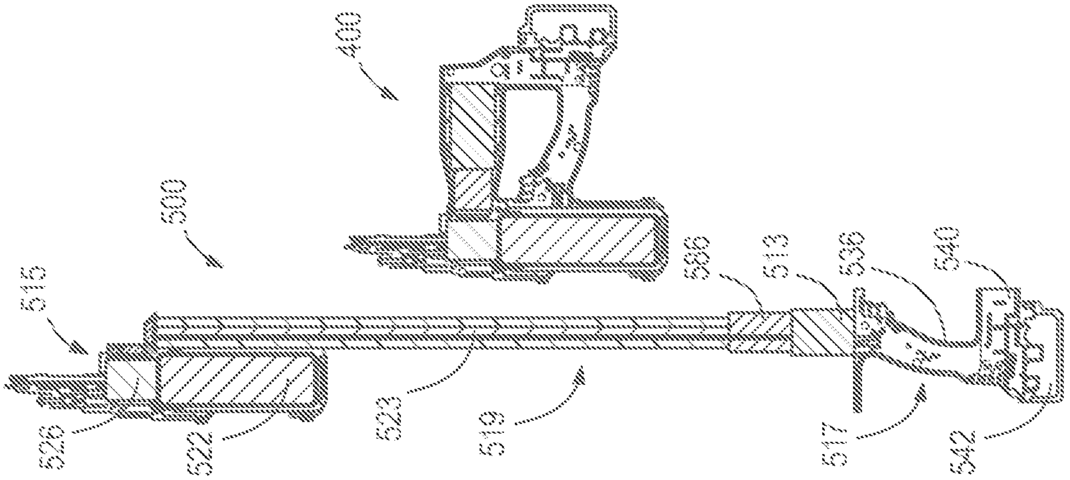
FIG. 34 is a schematic view of two fastener drivers.
Figure 33:
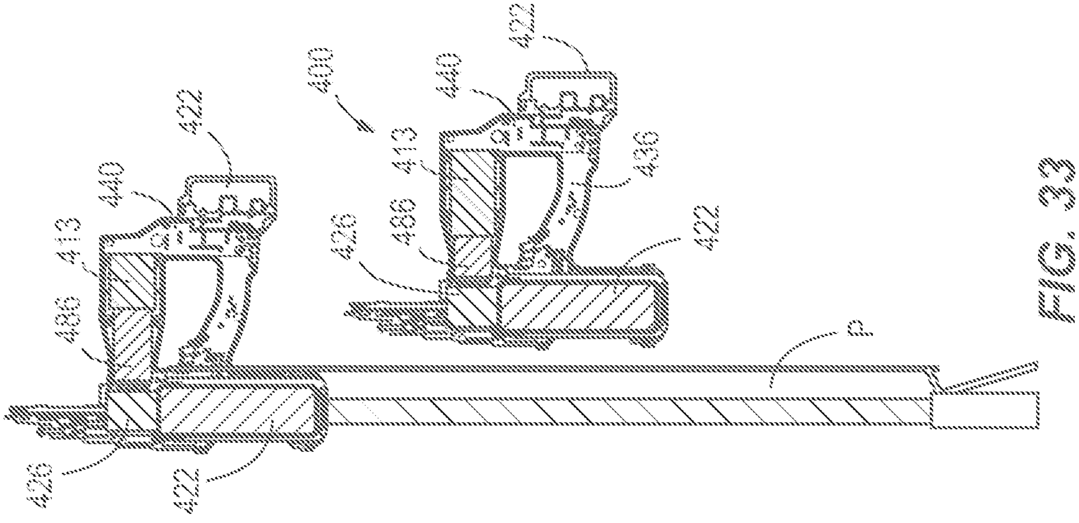
FIG. 33 (Prior Art)
FIG. 33 is a schematic view of a prior art fastener driver.

With reference to FIGS. 33-35, it will be appreciated that the motor, transmission, battery pack, and handle can be located in different locations relative to the drive blade and the gas spring. Specifically, FIG. 33 illustrates a prior art powered nailer 400 selectively attachable to a pole extension P to perform overhead fastening operations. The powered nailer 400 includes a motor 413, a transmission 486, a gas spring 422, a lifter mechanism 426, a battery receptacle 440 for receiving a battery pack 442, and a gripping portion or handle 436 all locally contained within the powered nailer 400. FIG. 34 illustrates a powered nailer 500 for performing overhead fastening operations according to another embodiment. The powered nailer 500 includes a nailer portion 515 and a handle portion 517 separated from the nailer portion 515 by an extension portion 519. In the illustrated embodiment, the extension portion 519 is a pole section 519. A motor 513 and a transmission 586 are provided adjacent the handle portion 517, and the handle portion 517 includes a battery receptacle 540 for attaching a battery pack 542 and a gripping portion 536. A gas spring 522 and lifter mechanism 526 are provided at the nailer portion 515. Power is transmitted from the handle portion 517 to the nailer portion 515 via a driveshaft 523 that extends through the pole section 519. FIG. 35 illustrates the arrangement of components found in the powered nailer 300 described above. Specifically, the motor 313, transmission 386, gas spring 322, and lifter mechanism 326 are all contained within the driver unit N3. Meanwhile, the gripping portion 336 and the battery receptacle 340 are provided with the handle unit H. The handle extension E connects the handle unit H to the driver unit N3 for performing overhead fastening operations.

Figure 36A:
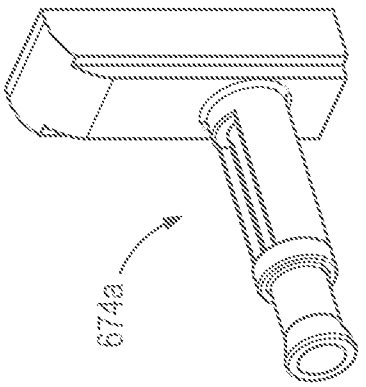
FIGS. 36A-36H are schematic perspective views of a barrel of the powered fastener driver of FIG. 1
Figure 36B:
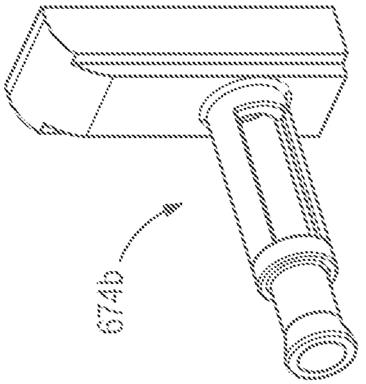
Figure 36C:
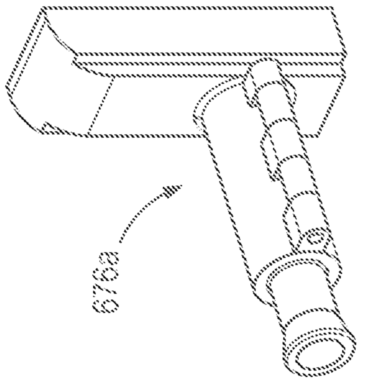
Figure 36D:
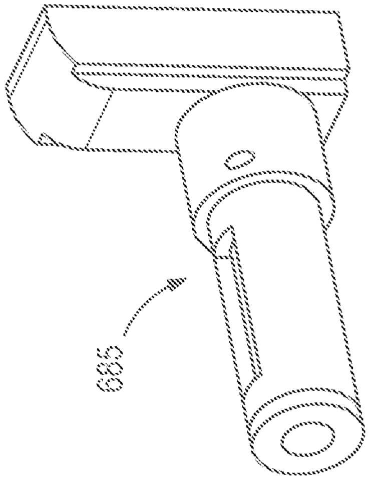
Figure 36E:
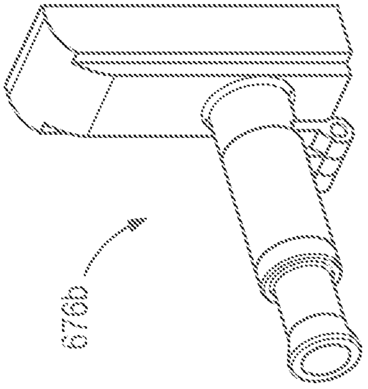
Figure 36F:
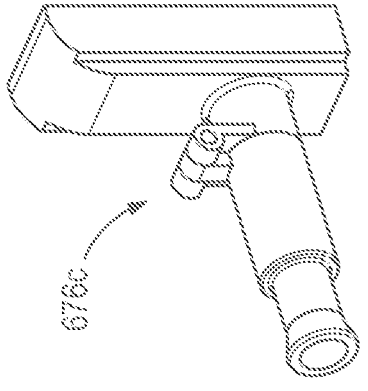
Figure 36G:
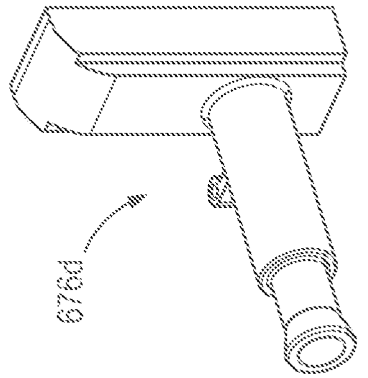
Figure 36H:
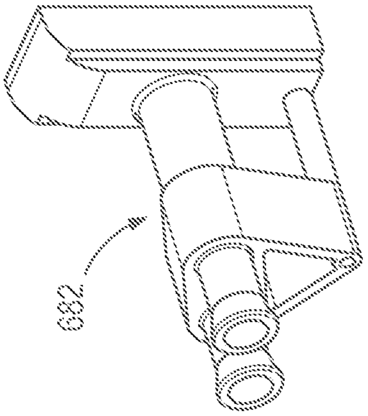

Another challenge is providing a comfortable means for inserting individual nails into the powered nailer 10, 200, 300. FIGS. 36A-36F illustrate various barrel designs which may be provided with the powered nailers 10, 200, or 300. In some embodiments, the powered nailer 10, 200, 300 includes a top slot 674*a* (FIG. 36A) provided in a top of a barrel of the nosepiece to receive the nail. In other embodiments, the powered nailer 10, 200, 300 includes a side slot 674*b* (FIG. 36B) provided in a side of a barrel of the nosepiece to receive the nail. In other embodiments, the powered nailer 10, 200, 300 includes a side hinge barrel segment 676*a* (FIG. 36C) that opens to receive a nail. In other embodiments, the powered nailer 10, 200, 300 includes a torsion sleeve 685 (FIG. 36D) that rotates to reveal an opening for receiving the nail. In other embodiments, the powered nailer 10, 200, 300 includes a break-barrel 676*b* (FIG. 36E) that rotates about a bottom hinge to reveal an opening for receiving the nail. In other embodiments, the powered nailer 10, 200, 300 includes a top hinge 676*c* (FIG. 36F) about which a door of the barrel rotates to reveal an opening for receiving the nail. In other embodiments, the powered nailer 10, 200, 300 includes a side arm 676*d* (FIG. 36G) for receiving the nail. In other embodiments, the powered nailer 10, 200, 300 includes a harmonica revolver 682 (FIG. 36H) that rotates to reveal an opening for receiving the nail.

Figure 37:
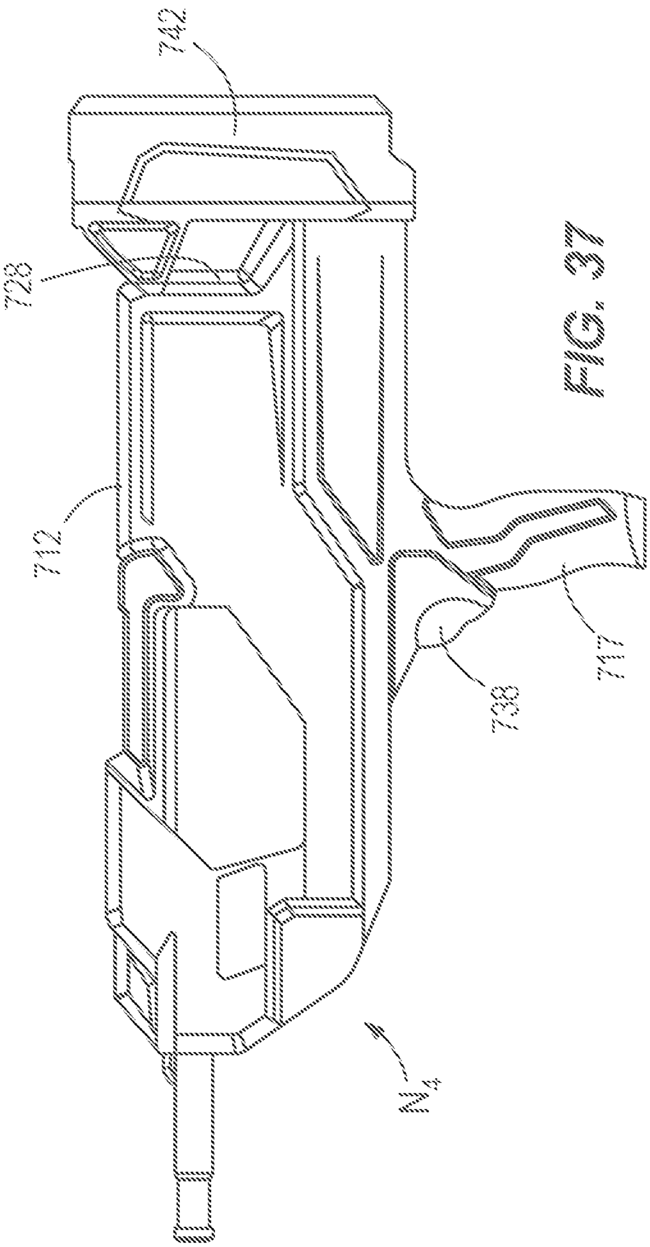
FIG. 37 is a plan view of a powered fastener driver arranged in a first configuration.
Figure 38:
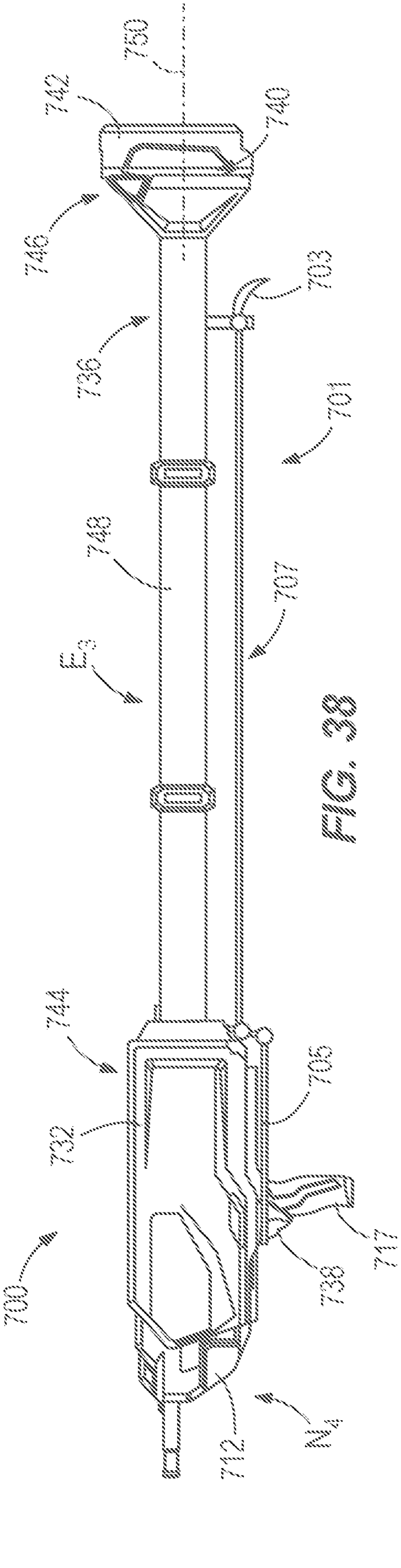
FIG. 38 is a plan view of the powered fastener driver of FIG. 37 arranged in a second configuration.

FIGS. 37-38 illustrate another powered nailer 700 according to another embodiment of the invention. The powered nailer 700 includes a driver unit N4 and a handle extension E3 selectively and removably attachable to the driver unit N4. Unlike the driver units N, N2, and N3 described above, the driver unit N4 includes a handle portion 717 integrally formed with a housing 712. That is, the handle portion 717 is not detachable from the driver unit N4. A trigger 738 is coupled to the handle portion 717 and actuable to selectively activate the powered nailer 700 to drive fasteners into a workpiece. The housing 712 also defines a first coupler 728 that is selectively engageable with a removable and rechargeable battery pack 742. Additionally, the first coupler 728 is also selectively engageable with a corresponding second coupler 732 located on the handle extension E3. When engaged, the first and second couplers 728, 732 mechanically and electrically couple the driver unit N4 directly to the handle extension E3. Accordingly, the first coupler 728 is configured to selectively engage the battery pack 742, and the first coupler 728 is further configured to selectively engage the second coupler 732 of the handle extension E3 in lieu of the battery pack 742.

The first coupler 728 is supported at a first end 744 of the handle extension E3. The handle extension E3 also includes a battery receptacle 740 (for receiving the battery pack 742) located at a second end 746 of the handle extension E3, opposite the first end 744. An elongated shaft segment 748 extends along a shaft axis 750 between the first and second ends 744, 746. The shaft segment 748 includes a gripping portion 736 for grasping by a user, located adjacent the battery receptacle 740.

The handle extension E3 also includes a remote actuation mechanism 701 for initiating a fastener driving operation of the powered nailer 700 when the handle extension E3 is coupled to the driver unit N4. The actuation mechanism 701 includes a remote trigger 703 coupled to the handle extension E3 adjacent the gripping portion 736, a lever 705 coupled to the second coupler 732 adjacent the trigger 738, and a linkage assembly 707 that operatively couples the remote trigger 703 to the lever 705. To operate the powered nailer 700 with the handle extension E3, the user pulls the remote trigger 703, causing the linkage assembly 707 and the lever 705 to communicate motion of the remote trigger 703 to the trigger 738. Actuation of the trigger 738 causes a fastener to be fired into the workpiece or work surface.

The powered nailer 700 is operable in a first configuration with the driver unit N4 directly attached to the battery pack 742 (FIG. 37). Alternatively, the powered fastener driver 700 is operable in a second configuration with the handle extension E3 coupled between the battery pack 742 and the driver unit N4 (FIG. 38). In the second configuration, the user grips the gripping portion 736 and actuates the remote trigger 703 to initiate a fastener driving operation. Movement of the remote trigger 703 is communicated to the lever 705 via the linkage assembly 707, so that the lever 705 presses the trigger 738, causing electrical power supplied from the battery pack 742 to energize the driver unit N4.

Various features of the invention are set forth in the following claims.

What is claimed is:

1. A powered fastener driver for driving fasteners into a workpiece, the powered fastener driver comprising:

a driver unit having a drive axis;

a handle unit selectively and removably attachable to the driver unit; and a handle extension having a first end and a second end, the handle extension being selectively and removably attachable to the driver unit at the first end such that a handle extension axis is generally parallel to the drive axis, and being selectively and removably attachable to the handle unit at the second end;

wherein the powered fastener driver is adjustable between a first configuration in which the handle unit is directly attached to the driver unit and extends from the driver unit along a first axis that is generally orthogonal to the drive axis, and a second configuration in which the driver unit is attached to the handle extension at the first end, and the handle unit is attached to the handle extension at the second end such that the handle unit extends relative to the driver unit along a second axis that is generally parallel to the drive axis and the handle extension axis and that is non-coaxial with the first axis, wherein to achieve the first configuration, the handle unit is mountable directly to the driver unit along a first mounting direction that is generally parallel to the drive axis, and to achieve the second configuration, the handle unit is mountable to the second end of the handle extension along a second mounting direction that is different from the first mounting direction and generally orthogonal to the drive axis and the handle extension axis.

2. The powered fastener driver of claim 1, wherein the handle extension includes an elongated shaft segment extending between the first end and the second end.

3. The powered fastener driver of claim 2, wherein the handle extension includes a saddle affixed to the elongated shaft segment at the first end, the saddle defining a receptacle for receiving the driver unit.

4. The powered fastener driver of claim 3, wherein the saddle includes a coupler.

5. The powered fastener driver of claim 2, further comprising a battery pack and wherein:

the driver unit further includes a first center of gravity;

the handle unit further includes a battery pack receptacle and a second center of gravity;

wherein the battery pack is couplable to the battery pack receptacle for powering the drive unit, the battery pack having a third center of gravity and the handle extension a fourth center of gravity, the elongated shaft segment includes a shaft axis, wherein, in the second configuration, the battery pack is intersected by the shaft axis and the first center of gravity, the second center of gravity, the third center of gravity, and the fourth center of gravity are located generally in-line with the shaft axis.

6. The powered fastener driver of claim 1, wherein the handle extension includes a first coupler located at the first end, and a second coupler located at the second end.

7. The powered fastener driver of claim 6, wherein the first coupler selectively engages a third coupler on the driver unit to mechanically and electrically connect the driver unit to the handle extension, and wherein the second coupler selectively engages a fourth coupler on the handle unit to mechanically and electrically connect the handle unit to the handle extension.

8. The powered fastener driver of claim 1, further comprising an alignment device configured to indicate to a user when the powered fastener driver is positioned in an orientation to drive fasteners perpendicularly into the workpiece.

9. The powered fastener driver of claim 8, wherein the alignment device comprises a positioning sensor.

10. The powered fastener driver of claim 8, wherein the alignment device comprises a positioning sensor and a digital readout configured to indicate to a user a direction toward which the powered fastener driver should be tilted to achieve perpendicularity with respect to the workpiece.

11. The powered fastener driver of claim 10, wherein the driver unit includes a housing, and the digital readout is coupled to the housing.

12. The powered fastener driver of claim 1, wherein the driver unit includes a housing and a nosepiece located at a front end of the housing, the nosepiece including a means for inserting fasteners into the powered fastener driver.

13. The powered fastener driver of claim 12, wherein the means for inserting fasteners is selected from a group consisting of a top slot provided in a barrel of the nosepiece, a side slot provided in a barrel of the nosepiece, a barrel having a side hinge barrel segment that opens to receive a fastener, a torsion sleeve that rotates to reveal an opening for receiving a fastener, a break-barrel that rotates about a bottom hinge to reveal an opening for receiving a fastener, a door that rotates about a top hinge to reveal an opening for receiving a fastener, a side arm for receiving a fastener, and a harmonica revolver that rotates to reveal an opening for receiving a fastener.

14. The powered fastener driver of claim 1, wherein the powered fastener driver comprises a gas-spring powered nailer.

15. The powered fastener driver of claim 1, wherein the driver unit further comprises:

a motor;

a cylinder;

a drive piston positioned within the cylinder;

a drive blade attached to the drive piston and movable therewith along the drive axis; and a lifter mechanism operable to return the drive piston and the drive blade to a top-dead-center position.

16. The powered fastener driver of claim 15, wherein the driver unit further comprises a transmission that couples the motor to the lifter mechanism.

17. A powered fastener driver for driving fasteners into a workpiece, the powered fastener driver comprising:

a driver unit having a motor, a drive axis, and a first center of gravity;

a handle unit selectively and removably attachable to the driver unit and including a battery pack receptacle and a second center of gravity; and a battery pack that is couplable to the battery pack receptacle for powering the motor, the battery pack having a third center of gravity;

a handle extension having a first end, a second end, a shaft extending between the first end and the second end along a shaft axis, and a fourth center of gravity, the handle extension being selectively and removably attachable to the driver unit at the first end such that the shaft axis is generally parallel to the drive axis, and being selectively and removably attachable to the handle unit at the second end;

wherein the powered fastener driver is adjustable between a first configuration in which the handle unit is directly attached to the driver unit and a second configuration in which the driver unit is attached to the handle extension at the first end and the handle unit is attached to the handle extension at the second end, wherein to achieve the first configuration, the handle unit is mountable to the driver unit along a first mounting direction that is generally parallel to the drive axis, and to achieve the second configuration, the handle unit is mountable to the second end of the handle extension along a second mounting direction that is different than the first mounting direction and generally orthogonal to the drive axis and the shaft axis, wherein, in the second configuration, the battery pack is intersected by the shaft axis and the first center of gravity, the second center of gravity, the third center of gravity, and the fourth center of gravity are located generally in-line with the shaft axis.

18. The powered fastener driver of claim 17, wherein the handle unit defines a first gripping location and the handle extension defines a second gripping location, and wherein an origin is positioned between the first gripping location and the second gripping location and is generally in-line with the shaft axis.

19. The powered fastener driver of claim 17, further comprising an alignment device configured to indicate to a user when the powered fastener driver is positioned in an orientation to drive fasteners perpendicularly into the work-piece.

20. The powered fastener driver of claim 17, wherein the driver unit further comprises:

a cylinder;

a drive piston positioned within the cylinder;

a drive blade attached to the drive piston and movable therewith along the drive axis; and a lifter mechanism operable to return the drive piston and the drive blade to a top-dead-center position.

21. The powered fastener driver of claim 20, wherein the driver unit further comprises a transmission that couples the motor to the lifter mechanism.

22. The powered fastener driver of claim 20, wherein the driver unit includes a housing and a nosepiece located at a front end of the housing, the nosepiece including a means for inserting fasteners into the powered fastener driver.

* * * * *